United States Patent
Guillo et al.

(10) Patent No.: US 12,387,484 B2
(45) Date of Patent: *Aug. 12, 2025

(54) CONSTRUCTION STAGE DETECTION USING SATELLITE OR AERIAL IMAGERY

(71) Applicants: Corentin Guillo, Toulouse (FR); Sivakumaran Somasundaram, Glasgow (GB)

(72) Inventors: Corentin Guillo, Toulouse (FR); Sivakumaran Somasundaram, Glasgow (GB)

(73) Assignee: Metrostudy Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,286

(22) Filed: Jan. 25, 2024

(65) Prior Publication Data

US 2024/0320969 A1    Sep. 26, 2024

Related U.S. Application Data

(63) Continuation of application No. 17/854,280, filed on Jun. 30, 2022, now Pat. No. 11,900,670.

(51) Int. Cl.
| | |
|---|---|
| *G06V 20/10* | (2022.01) |
| *G06Q 50/08* | (2012.01) |
| *G06V 10/40* | (2022.01) |
| *G06V 10/82* | (2022.01) |
| *G06V 20/13* | (2022.01) |

(52) U.S. Cl.
CPC .......... *G06V 20/176* (2022.01); *G06Q 50/08* (2013.01); *G06V 10/40* (2022.01); *G06V 10/82* (2022.01); *G06V 20/13* (2022.01); *G06V 20/182* (2022.01)

(58) Field of Classification Search
CPC ........ G06Q 50/08; G06V 10/40; G06V 10/82; G06V 20/13; G06V 20/176; G06V 20/182
See application file for complete search history.

(56) References Cited

U.S. PATENT DOCUMENTS

| | | | | |
|---|---|---|---|---|
| 10,528,812 | B1* | 1/2020 | Brouard | G06V 20/176 |
| 11,527,061 | B1* | 12/2022 | Gray | G06V 20/176 |
| 11,900,670 | B2* | 2/2024 | Guillo | G06V 10/40 |
| 2024/0119729 | A1* | 4/2024 | Manohar | G06V 20/17 |
| 2024/0330857 | A1* | 10/2024 | Srinivasan | G06Q 10/103 |

FOREIGN PATENT DOCUMENTS

| | | | | |
|---|---|---|---|---|
| CN | 110929607 A | * | 3/2020 | G06K 9/00637 |

* cited by examiner

*Primary Examiner* — Michael J Vanchy, Jr.
(74) *Attorney, Agent, or Firm* — James A. Italia; Italia IP

(57) ABSTRACT

Methods, non-transitory computer-readable storage media, and computer or computer systems directed to detecting, analyzing, and tracking stages of housing construction using satellite or aerial imagery in combination with a machine learned model are described.

5 Claims, 36 Drawing Sheets
(32 of 36 Drawing Sheet(s) Filed in Color)

```
{
  "_id": "50642d35efe074a4ae3304407b4cd331fa5880d5cfc68ae3743d41927b",
  "featureName": "DL3062",
  "label": "completed",
  "productType": "CHD",
  "Centroid": {"type": "Point", "coordinates": [-81.577842, 30.440444]},
  "confidenceScore": 0.8650480508043210,
  "maskGeometry": {
    "type": "Polygon",
    "coordinates":
    [
      [
        [-81.5777698159217, 30.44035131282043],
        [-81.5777887833118, 30.44035593781781],
        [-81.5779253840446, 30.44037443780734],
        [-81.5779307484626, 30.44047156275239],
        [-81.5779200196266, 30.44049006274193],
        [-81.5778717398643, 30.44053166771837],
        [-81.5777751803398, 30.44053166771837],
        [-81.5777698159217, 30.44035131282043]
      ]
    ]
  }
}
```

FIG. 31

```
{
    "_id": "50642d35efe074a4ae330407b4cd331fa5880d5cfc68ae3743d41927b",
    "featureName": "DL17211",
    "label": "Yes",
    "productType": "NUCD",
    "Centroid": {"type": "Point", "coordinates": [-81.577842, 30.440444]},
    "confidenceScore": 0.8650480508804321,
    "boundingBoxGeometry": {
        "type": "Polygon",
        "coordinates": [
            [
                [-81.5777698159217, 30.4403513128204],
                [-81.5778878331184, 30.4403559378178],
                [-81.5779253840446, 30.4403744378073],
                [-81.5779307484626, 30.4404715627523],
                [-81.5777698159217, 30.4403513128204]
            ]
        ]
    }
}
```

FIG. 32

```
{
    "id": "50642d35efe074a4ae330407b4cd331fa5880d5cfc68ae3743d41927b",
    "featureName": "DL219215",
    "label": "Road",
    "productType": "GRID",
    "Centroid": {"type": "Point", "coordinates": [-81.577842, 30.440444]},
    "confidenceScore": 0.782618050004321,
    "boundingBoxGeometry": {
        "type": "Polygon",
        "coordinates": [
            [
                [-81.57776981592178, 30.44035131282043],
                [-81.57788783311844, 30.440355937817813],
                [-81.57792538404465, 30.44037443780734б],
                [-81.57793074846268, 30.440471562752396],
                [-81.57776981592178, 30.44035131282043]
            ]
        ]
    }
}
```

FIG. 33

| Day * | Activity | Remarks |
|---|---|---|
| D0 | User has a location they are interested in where house construction is likely to happen.<br><br>They add this location (named L-1) by outline its boundary in a custom app. | The custom app is hosted on the internet and is accessible from anywhere. |
| D1 | An aerial imagery operator captures imagery that covers the location L-1 | This is an independent operation, and we control no aspect of this.<br><br>A notification by email is sent to the user about this (Image Availability Notification). |
| D1 + 1 day | The extent of image that covers L-1 is downloaded from the imagery operator by the system | The download occurs after geographic algorithms and processing determine the extent of data required. |
| D1 + 1 day | The image is fed to a model that predicts where houses are and what is their status (*foundation, slab, under construction or completed*) | This happens automatically through Artificial Intelligence Algorithms and processing |
| D1 + 1 day | The model outputs are imported back in the custom app for the user to review. | A notification by email is sent to the user about this (iPoints Availability Notification). |

\*
Day 0 is the reference date
Day 1 is the day an image is acquired over the location (could be anywhere between 1 and 90 days, depends on the location)

FIG. 36

CONSTRUCTION STAGE DETECTION USING SATELLITE OR AERIAL IMAGERY

CROSS REFERENCE TO RELATED APPLICATION

This is a continuation application of U.S. Non-Provisional Utility application Ser. No. 17/854,280 which has a filing date of Jun. 30, 2022, the contents of which are incorporated herein by this reference.

FIELD

The present disclosure is directed to the field of image processing for detecting analyzing, and tracking stages of housing construction.

BACKGROUND

The construction industry (both residential and commercial) benefits from a well-planned, organized workflow in turning empty land into a variety of purpose-oriented buildings and amenities. Tracking such activity is of interest to the stakeholders for meeting financial and temporal deadlines. The earliest milestone is the onset of construction activity. This activity indicates budget allocation, clearances (legal and council/county) from local authorities, and the go-ahead for laying public amenities such as electricity, water, and sewage. Therefore, evidence of residential construction activity in an empty land is one milestone in the lifecycle. Other milestones include the measure of the number of houses and at which stage of construction activity they are at. From aggregates of these numbers, supply, demand, and other economic indicators can be discerned.

Another milestone related to construction projects is the start of activity in a project area. Among the many activities at the start is the leveling and grading of the area followed by laying out roads, which precedes moving in construction material and machinery. From an administrative and financial perspective, it signifies that the company has the financial resources and approvals to start work. It is also of interest for the data company to now start tracking this project because the inventory of houses can be expected to be added into the economy.

Data related to such construction activity is acquired by nominated people driving through the project sites and visually ascertaining the initiation of construction or roads or the different stages of construction each house is at. This data is then collected regionally in offices and collated into a data table. Metrics and indicators are then calculated on a state/country level.

SUMMARY

In general, in a first aspect, the disclosure features a method which includes receiving a satellite or aerial image, or portion thereof, of a geographic area as input into a machine learned model trained with a set of satellite or aerial images having features characteristic of housing at one or more stages of construction and corresponding labels representing such stages, determining from the machine learned model which features in the satellite or aerial image or portion thereof correspond to which stages of construction, and sending an output from the machine learned model, the output including one or more predictions of the stages of construction determined for the features in the satellite or aerial image or portion thereof.

In general, in a second aspect, the disclosure features a method which includes selecting a geographic area of interest on a map or satellite or aerial image, causing a satellite or aerial image or portion thereof corresponding to the geographic area of interest to be sent as input for a machine learned model trained with a set of satellite or aerial images having features characteristic of housing at one or more stages of construction and corresponding labels representing such stages, and receiving one or more output from the machine learned model, the output including one or more predictions of the stages of construction determined for the features in the satellite or aerial image or portion thereof.

In general, in a third aspect, the disclosure features a method which includes extracting metadata from one or more satellite or aerial images having features characteristic of housing at one or more stages of construction stored in a first non-transitory computer readable memory, cross-referencing geographic information present in the metadata with geographic information inputted as a selected geographic area of interest, and receiving one or more of the satellite or aerial images from the first non-transitory computer readable memory for storage in a second non-transitory computer readable memory based upon common geographic information present in the metadata and the geographic area of interest.

In general, in a fourth aspect, the disclosure features one or more non-transitory, computer-readable storage media having instructions for execution by the one or more processors, the instructions programmed to cause the one or more processors to receive a satellite or aerial image, or portion thereof, of a geographic area as input into a machine learned model trained with a set of satellite or aerial images having features characteristic of housing at one or more stages of construction and corresponding labels representing such stages, determine from the machine learned model which features in the satellite or aerial image or portion thereof correspond to which stages of construction, and send an output from the machine learned model, the output including one or more predictions of the stages of construction determined for the features in the satellite or aerial image or portion thereof.

In general, in a fifth aspect, the disclosure features one or more non-transitory, computer-readable storage media having instructions for execution by the one or more processors, the instructions programmed to cause the one or more processors to select a geographic area of interest on a map or satellite or aerial image, cause a satellite or aerial image or portion thereof corresponding to the geographic area of interest to be sent as input for a machine learned model trained with a set of satellite or aerial images having features characteristic of housing at one or more stages of construction and corresponding labels representing such stages, and receive one or more output from the machine learned model, the output including one or more predictions of the stages of construction determined for the features in the satellite or aerial image or portion thereof.

In general, in a sixth aspect, the disclosure features one or more non-transitory, computer-readable storage media having instructions for execution by the one or more processors, the instructions programmed to cause the one or more processors to extract metadata from one or more satellite or aerial images having features characteristic of housing at one or more stages of construction stored in a first non-transitory computer readable memory, cross-reference geographic information present in the metadata with geographic information inputted as a selected geographic area of interest, and receive one or more of the satellite or aerial images from the first non-transitory computer readable memory for storage in a second non-transitory computer readable memory based upon common geographic information present in the metadata and the geographic area of interest.

In general, in a seventh aspect, the disclosure features a computer or computer system which includes one or more processors designed to execute instructions, one or more non-transitory, computer-readable memories storing program instructions for execution by the one or more processors, the instructions programmed to cause the one or more processors to receive a satellite or aerial image, or portion thereof, of a geographic area as input into a machine learned model trained with a set of satellite or aerial images having features characteristic of housing at one or more stages of construction and corresponding labels representing such stages, determine from the machine learned model which features in the satellite or aerial image or portion thereof correspond to which stages of construction, and send an output from the machine learned model, the output including one or more predictions of the stages of construction determined for the features in the satellite or aerial image or portion thereof.

In general, in an eighth aspect, the disclosure features a computer or computer system which includes one or more processors designed to execute instructions, one or more non-transitory, computer-readable memories storing program instructions for execution by the one or more processors, the instructions programmed to cause the one or more processors to select a geographic area of interest on a map or satellite or aerial image, cause a satellite or aerial image or portion thereof corresponding to the geographic area of interest to be sent as input for a machine learned model trained with a set of satellite or aerial images having features characteristic of housing at one or more stages of construction and corresponding labels representing such stages, and receive one or more output from the machine learned model, the output including one or more predictions of the stages of construction determined for the features in the satellite or aerial image or portion thereof.

In general, in a ninth aspect, the disclosure features a computer or computer system which includes one or more processors designed to execute instructions, one or more non-transitory, computer-readable memories storing program instructions for execution by the one or more processors, the instructions programmed to cause the one or more processors to extract metadata from one or more satellite or aerial images having features characteristic of housing at one or more stages of construction stored in a first non-transitory computer readable memory, cross-reference geographic information present in the metadata with geographic information inputted as a selected geographic area of interest, and receive one or more of the satellite or aerial images from the first non-transitory computer readable memory for storage in a second non-transitory computer readable memory based upon common geographic information present in the metadata and the geographic area of interest.

Features of the methods, non-transitory computer-readable storage media, and computer or computer systems can include the following. The machine learned model can be a trained Convolutional Neural Network (CNN). The one or more stages can be chosen from stages which include slab, foundation, under construction, and completed. The machine learned model can be stored on a non-transitory computer-readable memory. The receiving, determining, and sending steps can be performed by one or more processor. The satellite or aerial image or portion thereof of a geographic area can be stored on a non-transitory computer-readable memory. The satellite or aerial image or portion thereof can be received from a satellite or aerial imagery provider service. The output can include a probability that the identified feature represents a stage of construction. Pixel locations in the satellite or aerial image or portion thereof can be converted to geographic coordinates and the geographic coordinates can be outputted. The output can be displayed on the satellite or aerial image or portion thereof provided as input to the machine learned model. Input such as selecting and causing can be based upon input from a user interface. The input can include one or more location information chosen from information including city, county, state, zip code, geographic coordinates and tax parcel number. The input can include providing an outline surrounding the geographic area of interest. The one or more output can be received by the user interface. The one or more output can be chosen from information including a boundary, a center point, geographic location, and stage of construction of houses in the satellite or aerial image or portion thereof. The selecting, causing, and receiving steps can be performed by one or more processors. The first non-transitory computer readable memory can have stored thereon a library of satellite or aerial images provided by a satellite or aerial imagery provider service. A portion of the one or more satellite or aerial images can be determined for reception from the first non-transitory computer readable memory based upon a measurement of an intersection of the geographic area of interest with the satellite or aerial image area such that the determined portion of the one or more satellite or aerial images is received and stored in the second non-transitory computer readable memory.

It should be understood that the methods, non-transitory computer-readable storage media, and computer or computer systems are not to be considered limitations on the invention defined by the claims. The featured methods, non-transitory computer-readable storage media, and computer or computer systems can be implemented in one or more ways using one or more features depicted in the drawings, described in the detailed description, and set forth in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings illustrate certain aspects and principles of the implementations set forth, and should not be construed as limiting.

Figure 14:
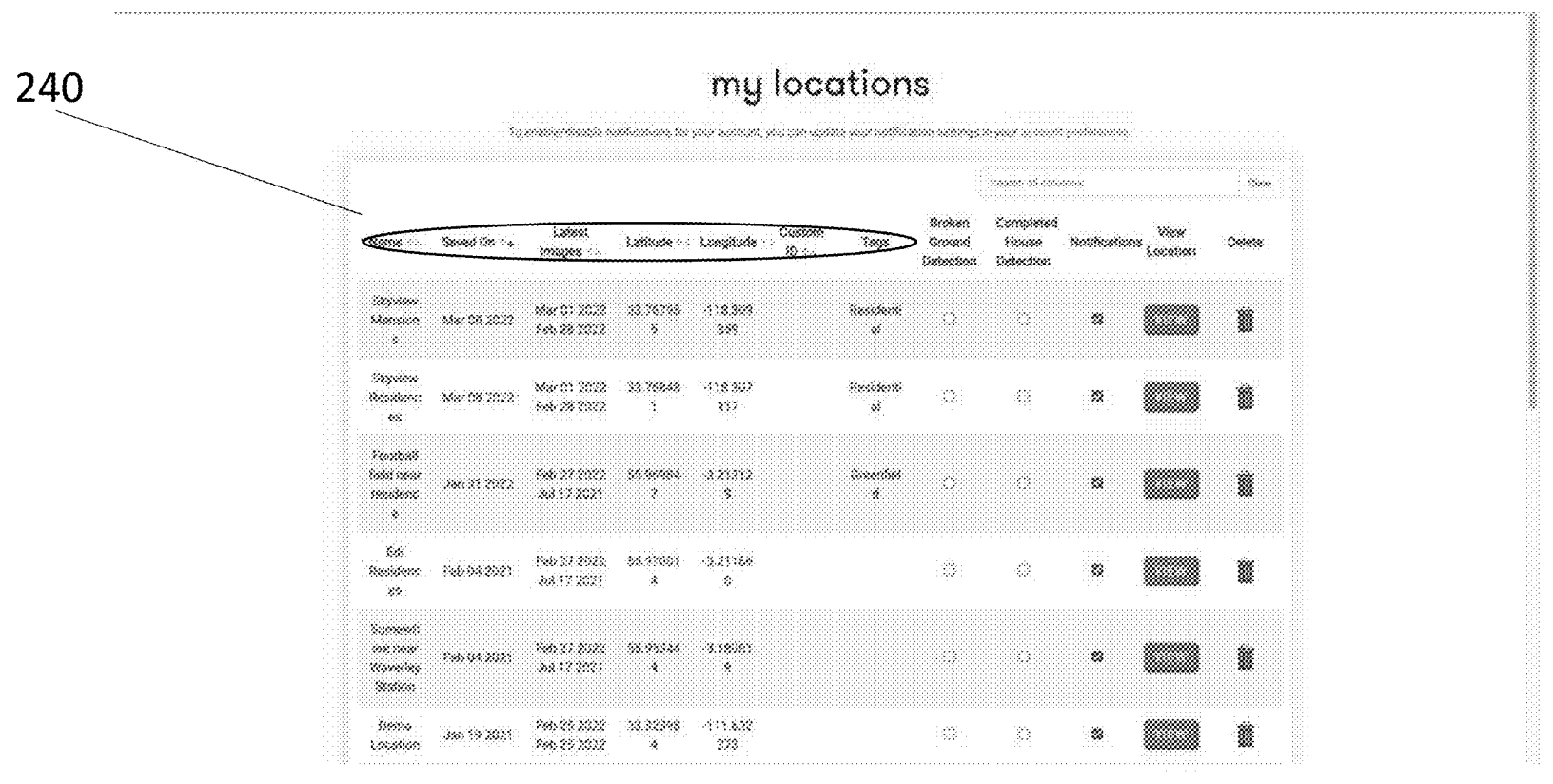

FIGS. 14-17 are screenshots of a user interface showing a Locations Management screen that lists locations saved by the user, associated information, and inputs for selecting actions according to some implementations.

FIG. 22 is a zoomed in view of the model predictions of FIG. 21.

FIG. 29 shows image pixel coordinates for one detection of a square segment from the model. Numbers indicate the coordinate values for the four corners of the square. FIG. 30 shows geographic coordinate values for the image.

FIGS. 31-33 are screenshots showing standardized formats of output data for stage of construction (FIG. 31), new construction (FIG. 32), and roads and grading (FIG. 33) for use in any geographic information system according to one implementation.

FIG. 36 is a table showing an example timeline of activities and interactions according to the process shown in FIG. 1 according to one implementation.

DETAILED DESCRIPTION

Figure 1:
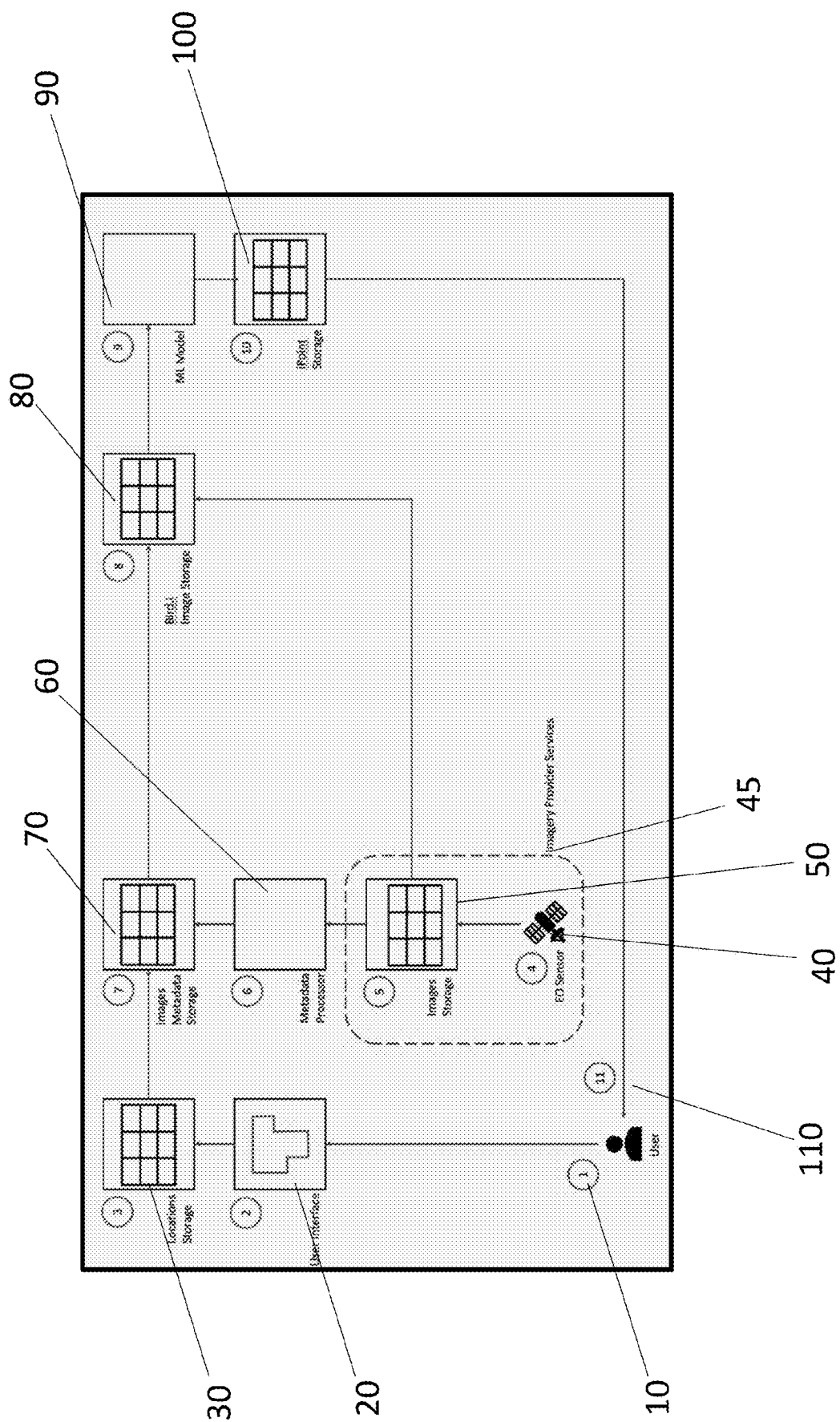
FIG. 1 is a flow chart showing a work and data flow process according to one implementation.

Reference will now be made in detail to various illustrative implementations. It is to be understood that the following discussion of the implementations is not intended to be limiting.

Implementations herein describe the use and processing of imagery captured by non-invasive remote sensing platforms to detect the initiation of housing construction, the progress of such construction through various stages, or presence or absence of road and/or grading. The imagery can be obtained through aerial remote sensing platforms including but not limited to drones, aircraft, and satellites. The imagery can include images types including monochromatic, panchromatic, multispectral, hyperspectral, binary, grayscale, indexed, infrared, RGB, radar or any combination thereof. Remote imagery from aerial platforms can be captured in broad daylight at resolutions which capture fine detail of the houses in an active residential project and/or features related to early construction activities and/or the features of grading and roads in a vacant plot of land. The images are scanned to determine the various stages or presence or absence of construction or road building activity.

In the field of Machine Learning, Convolutional Neural Networks (CNN) are an excellent function approximator for inferring features in an image. This is achieved by demarcating features with boundaries in a large set of images to facilitate the neural network to infer the correlation between different mutually exclusive features and corresponding labels and feeding them digitally into the neural network. Once the neural network has learnt the relation between the features in the image and its associated label, it is said to be trained. A trained neural network can not only detect the features, but also discriminate between various features. The trained neural network allows features in an image not seen by the network to be automatically detected by outputting a label based on the features it discerns from a new image fed in.

Using the combination of the above two capabilities then, the present inventors have developed an automatic method of identifying and classifying the stages of building construction, detecting where construction activity has begun, and establishing the presence or absence of grading and roads. This is possible because early onset of construction activity in an empty piece of land has very distinct features. Thus, with the simple act of expressing locations of interest, the aforementioned trained neural network can demarcate features in remote sensing imagery indicating stages of construction, areas where construction activity is initiated, or the presence or absence of grading and road development by acquiring images covering the area of interest and inputting them to the trained neural network. The neural network can then output confirmation of the presence or absence of the features related to construction or road/grading activity in the area of interest and provide updated tracking of these features. This has the advantage of obviating the need to send personnel to visit the sites to carry out a visual survey to obtain this information, which can be hampered by such factors as weather and availability of personnel.

One implementation provides a method of identifying a predefined status of a building structure in an optimized target image. The method includes training a neural network receiving training images and outline labels (slab, foundation, under construction, completed), thus creating a classifier (CNN) configured to identify the predefined state of each building structure in an optimized target image by dividing the image into regions using multiple proposals, and converting the outputs to a globally accepted data format for ingestion in geographic information systems.

Another implementation provides a method of detecting features related to the evidence of new construction activity in a target image. The method includes training a neural network receiving training images and outline labels (new construction), thus creating a classifier (CNN) configured to identify and demarcate areas of new construction activity by dividing the image into regions of multiple proposals.

Another implementation provides a method of discriminating roads and grading from empty land in a target image. The method includes training a neural network receiving training images and labels (road, grading, none), thus creating a classifier (CNN) configured to identify the presence or absence of predefined feature labels for a target image by dividing the image into equal square segmented parts of the image.

Another implementation provides a method that establishes the area of image required to be downloaded through geographic intersection calculations. The method can include saving a user's geographic location of interest in a storage system through a software user interface, calculating the exact extent of the aerial/satellite image to be downloaded by measuring the intersection of the users' area and satellite image area, and downloading and storing the image in a storage system for later use.

Another implementation provides a method of detecting and demarcating in real world geographical coordinates the various stages a building construction could be in. The method can include one or more of receiving, by one or more processors, image data containing buildings in one of the four stages of construction activity along with boundaries in pixel values and labels, and tuning, by one or more processors, the artificial neurons in a neural network such that an approximate function is identified to establish the relation between the features within a boundary and its corresponding label. The method can further include one or more of receiving, by one or more processors, image data corresponding to a geographic location of interest where building construction activities are ongoing, processing, by one or more processors, the image data to determine the boundaries in image pixel coordinates of various building features, determining, by one or more processors, that each boundary belongs to one and exclusively only one of the four stages of construction activity that a building might be in, and assigning, by one or more processors, a probabilistic score to the degree of confidence in demarcating the boundary and designating the stage to each building.

Another implementation provides a method for converting image pixel values to geographic coordinates and preparing the data for consumption. The method includes converting, by one or more processors, the boundary in image pixel coordinates to a real-world datum referenced geographic coordinate system, creating, by one or more processors, a schema of all information related to a building for ready consumption by a processor, distinguished by a globally unique identifier, and storing the data in a standardized format that facilitates easy consumption by the user interface that was used to input the geographic area of interest.

Figure 2:
FIG. 2 is a screenshot of a user interface with an image of a location a user has selected for detecting stages of housing construction showing a user drawn location according to one implementation.
Figure 3:
FIG. 3 is a screenshot of a user interface with an image of a location a user has selected for detecting new housing construction with drawing tools enabled according to one implementation.
Figure 4:
FIG. 4 is a screenshot of a user interface with an image of a location a user has selected for detecting new housing construction with a marker dropped at a location of interest according to one implementation.
Figure 5:
FIG. 5 is a screenshot of a user interface with an image of a location a user has selected for detecting new housing construction showing a save location option according to one implementation.
Figure 6:
FIG. 6 is a screenshot of a user interface with an image of a location a user has selected for detecting roads and grading with drawing tools enabled according to one implementation.
Figure 7:
FIG. 7 is a screenshot of a user interface with an image of a location a user has selected for detecting roads and grading with a polygon tool activated according to one implementation.
Figure 8:
FIG. 8 is a screenshot of a user interface with an image of a location a user has selected for detecting roads and grading with a polygon drawn over a location of interest according to one implementation.
Figure 9:
FIG. 9 is a screenshot of a user interface with an image of a location a user has selected for detecting roads and grading showing selection of the save location icon according to one implementation.

FIG. 1 depicts an overview a process that allows for detection of housing construction initiation, the various stages of such construction, or the presence or absence of roads and/or grading in a geographic area chosen by a user. As can be appreciated, the process represented by the flow chart diagram of FIG. 1 can be modified to remove or add one or more steps, change the order of steps, or substitute or exchange one or more steps in a manner that achieves the same effective result. It will be understood that each block of the flowchart diagram in FIG. 1, and combinations of blocks in the flowchart diagrams, can be implemented or supported by computer program instructions. These computer program instructions may be provided to a processor of a general-purpose computer, special purpose computer, or other programmable data processing device or combination of devices, such that the instructions, which execute via the processor or processors of the computer or other programmable data processing device(s), create means for implementing the functions/acts specified in the flowchart blocks. As such, the processes depicted herein can be performed as a series of steps which are implemented as computer-readable code, computer-readable instructions, computer-executable instructions, or "software" performed by one or more processor. Such software can be loaded onto a memory of computer, computing device, or system or combination thereof, as an application or program (or multiple applications or programs) capable of performing one or more steps of the process. As can be appreciated, different steps or groups of steps of the process of FIG. 1 can be performed by different computers or computing devices, or some or all can be performed by a single computer or computing device. FIG. 1 provides an overview of the process. A user 10 interacts with a user interface 20 which first provides an input screen which allows the user to define a geographic area or location of interest where potential residential housing construction may be occurring at various stages or may be beginning, or where grading has occurred, or roads have been laid in. The input screen can be a map or image (aerial, satellite) that allows a user to zoom in and out of or move through a geographic area either through control of a cursor or through input of data associated with the location such as city, county, state, zip code, geographic coordinates (latitude and longitude), or tax parcel number. The map or image can be provided from a service such as Google Maps, Bing Maps, or other internet service map/image provider. The user interface includes a draw tool which allows the user to capture a segment with the geographic area of interest. The draw tool can be controlled by a mouse, stylus, or other input device to define a boundary surrounding an area which the user has an interest in determining the stages and extent of housing construction within the area. The draw tool can be controlled by the user to define a rectilinear shape (i.e., polygon), a curvilinear shape, or any combination of rectilinear or curvilinear shapes, that encompass areas of sizes of less than an acre to hundreds of acres or more. The draw tool can also allow a user to input an overlay of a variety of geographic shape templates onto the map which the user can manipulate by selecting various points on the outline of the shape and dragging them on the input screen. The draw tool can also allow selection of various points on the map to define a boundary and connect them to define the area. As such, an area of any size and shape can be captured on the input screen by the user. In other implementations, the user inputs the area as a point of geographic coordinates which represents the centre of the geographic area of interest. When the user defines the geographic area of interest to their satisfaction, the user interface 20 allows the user to lock and select the shape or image for input into a location storage. An example of a selected shape which overlays a portion of a satellite image is shown in FIG. 2. The interface indicates selection of the shape by colorizing the interior of the shape. While the example image in FIG. 2 has some houses in it already in differing stages of construction, the user can input an area that represents an empty plot of land so construction or grading and road building activity can be tracked from the start and the onset and progress of such activity can be updated with predictions as new imagery becomes available. For example, FIG. 3 shows a user interface with drawing tools enabled, with a Location Point tool 130 shown. The user drops a marker 140 at a location of interest as shown in FIG. 4 and saves the location by selecting the save icon 150 shown in FIG. 5. Another example is shown in FIGS. 6-9 with respect to a potential area of road construction, where FIG. 6 shows a location polygon/outline drawing tool 160, FIG. 7 shows the location polygon/outline tool activated 170, FIG. 8 shows a polygon 180 drawn over an area of interest, and FIG. 9 shows a save icon 190 for saving the location.

Figure 10:
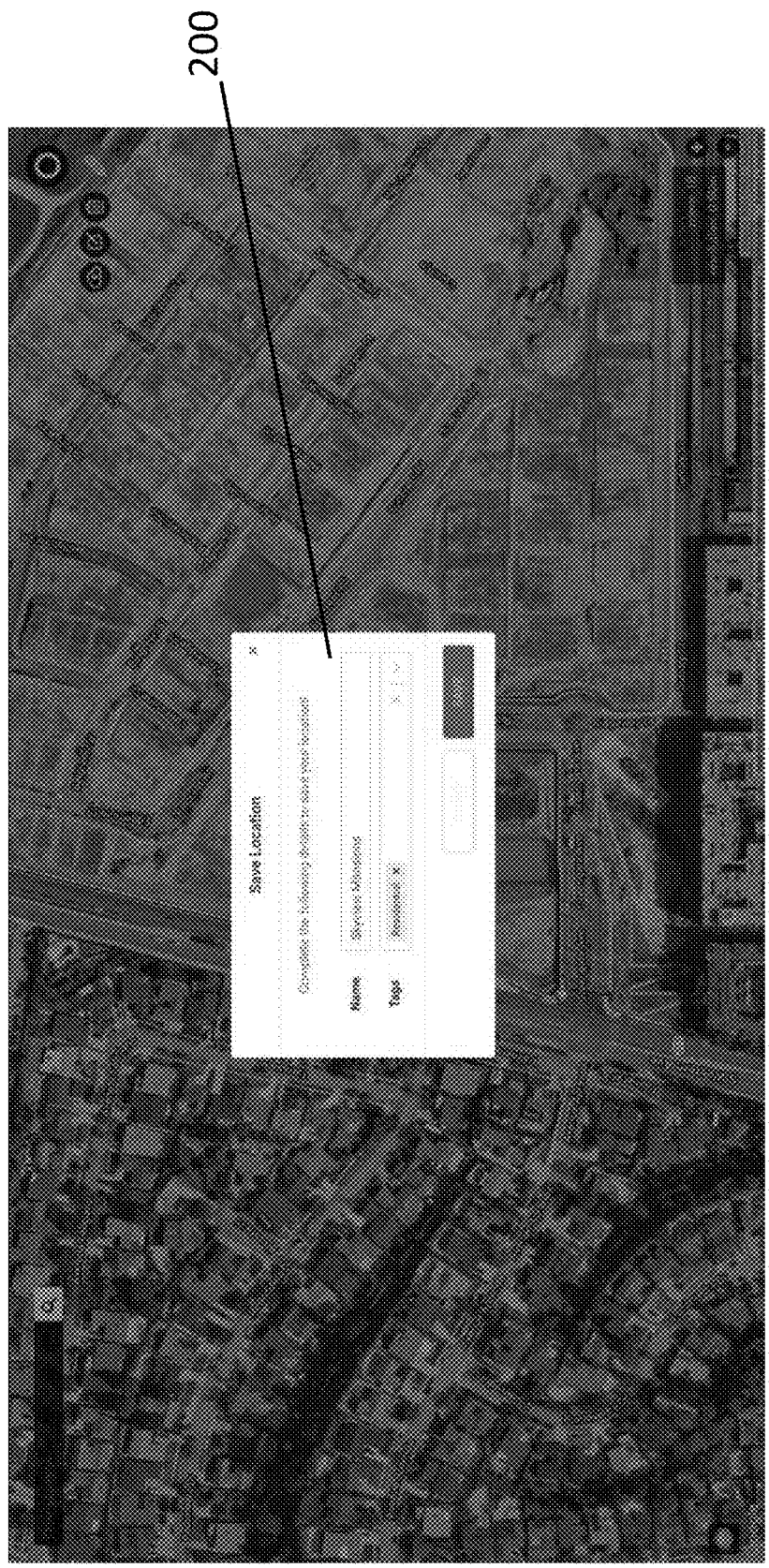
FIG. 10 is a screenshot of a user interface with an image of a location a user has selected for detecting new housing construction and an input box for providing a name and tags for saving the location to Locations Storage according to one implementation.
Figure 11:
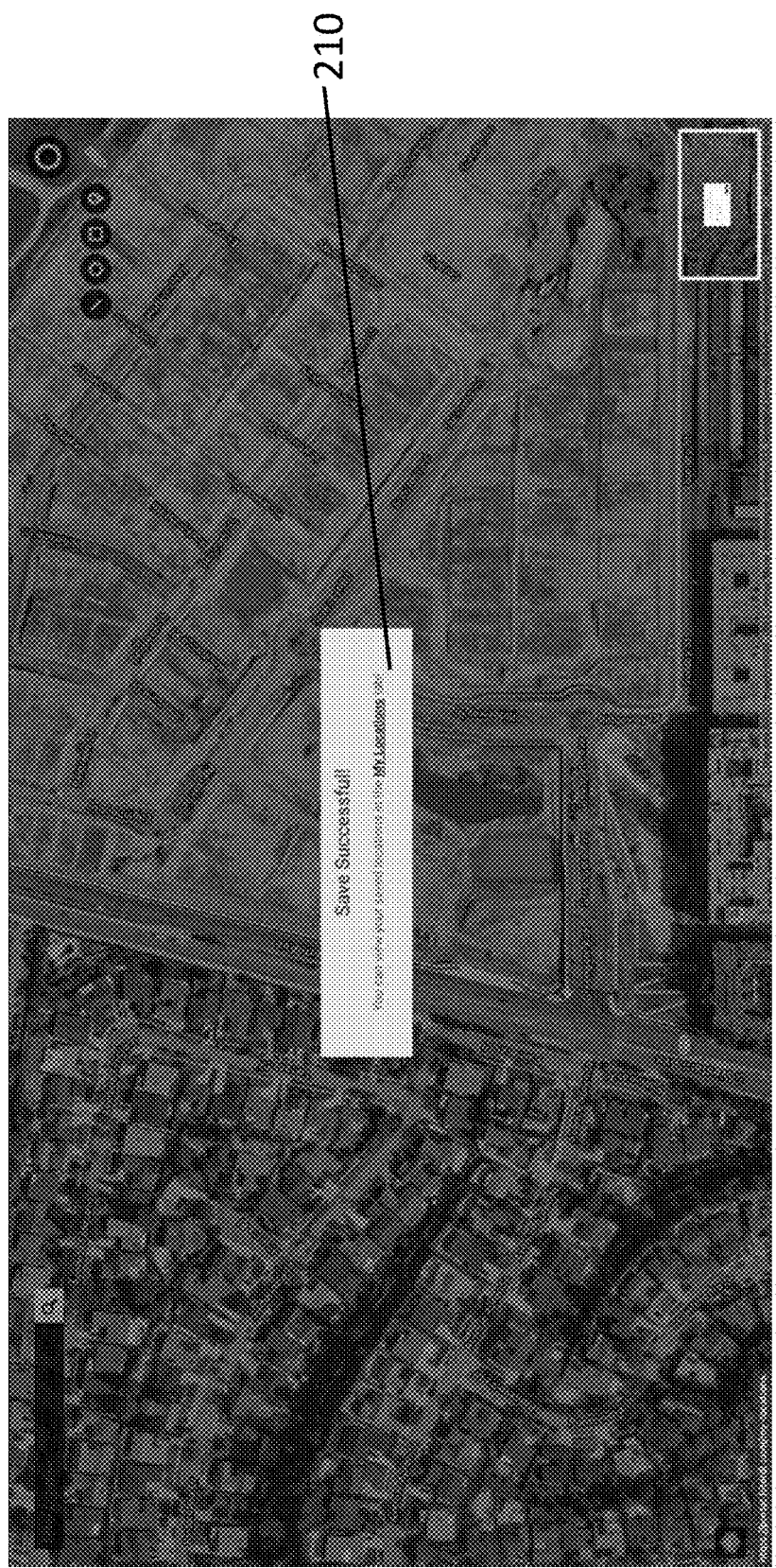
FIG. 11 is a screenshot of a user interface with an image of a location a user has selected for detecting new housing construction and a message providing feedback that the location was saved successfully according to one implementation.
Figure 12:
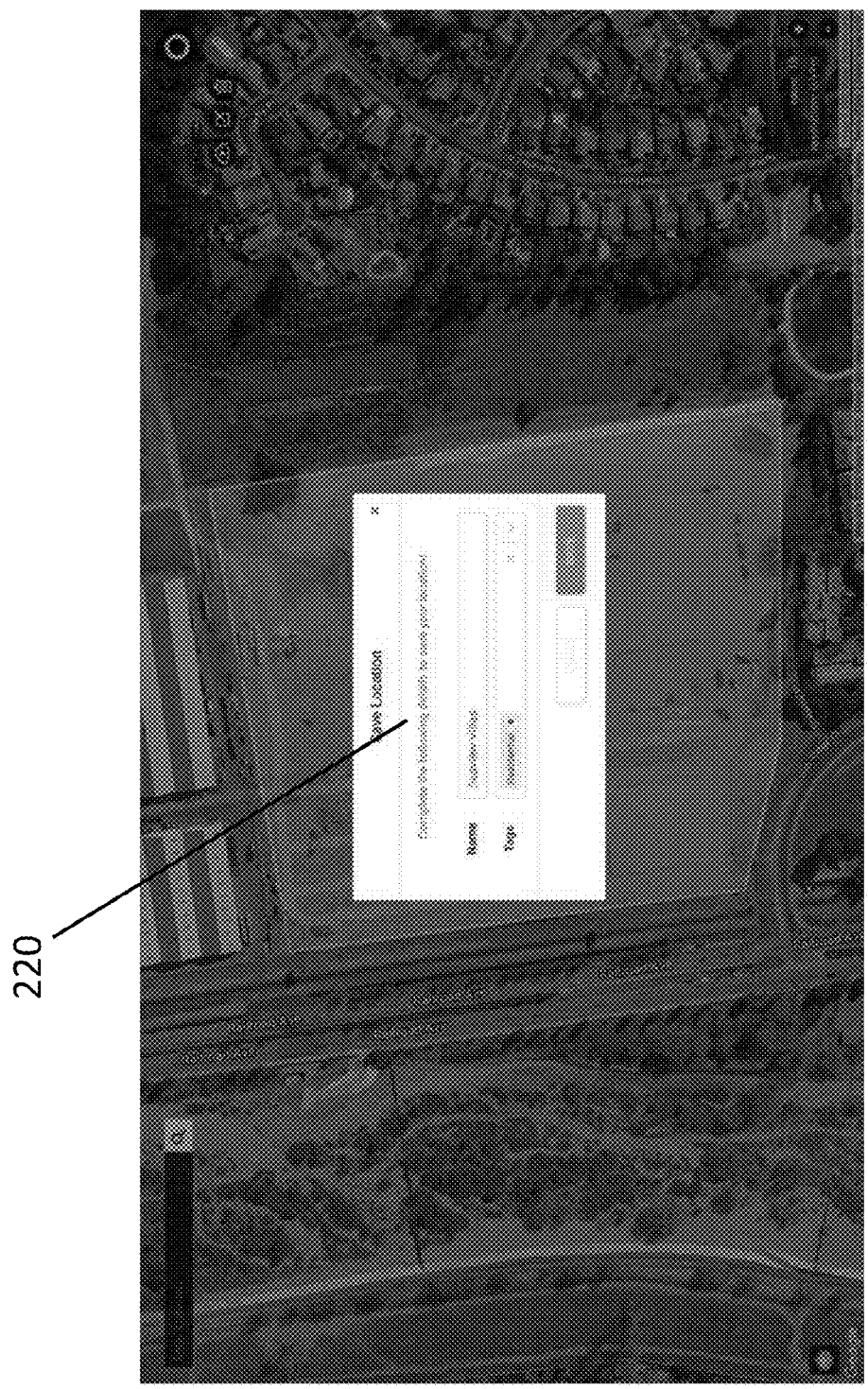
FIG. 12 is a screenshot of a user interface with an image of a location a user has selected for detecting grading and roads and an input box for providing a name and tags for saving the location to Locations Storage according to one implementation.
Figure 13:
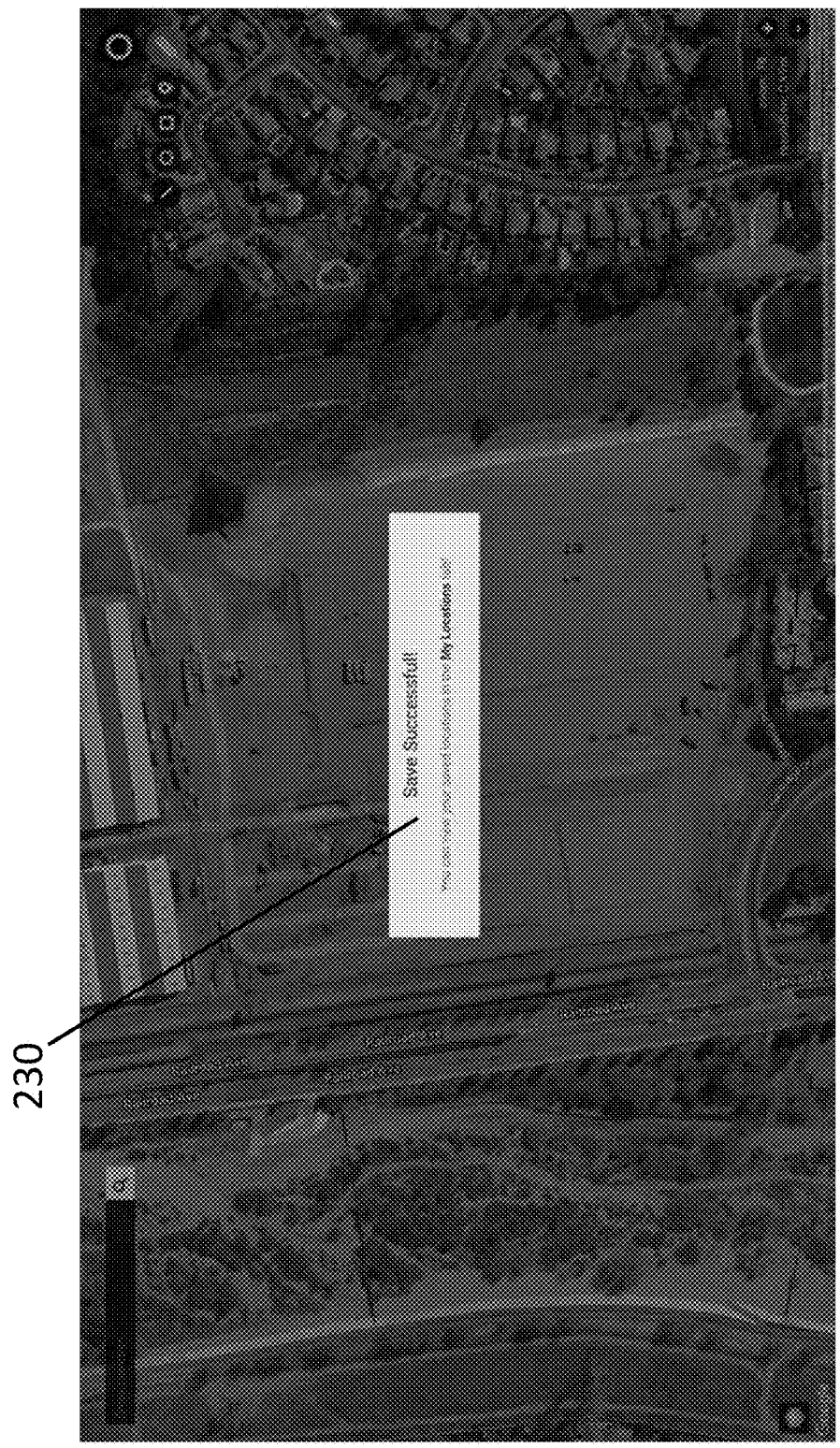
FIG. 13 is a screenshot of a user interface with an image of a location a user has selected for detecting grading and roads and a message providing feedback that the location was saved successfully according to one implementation.
Figure 15:
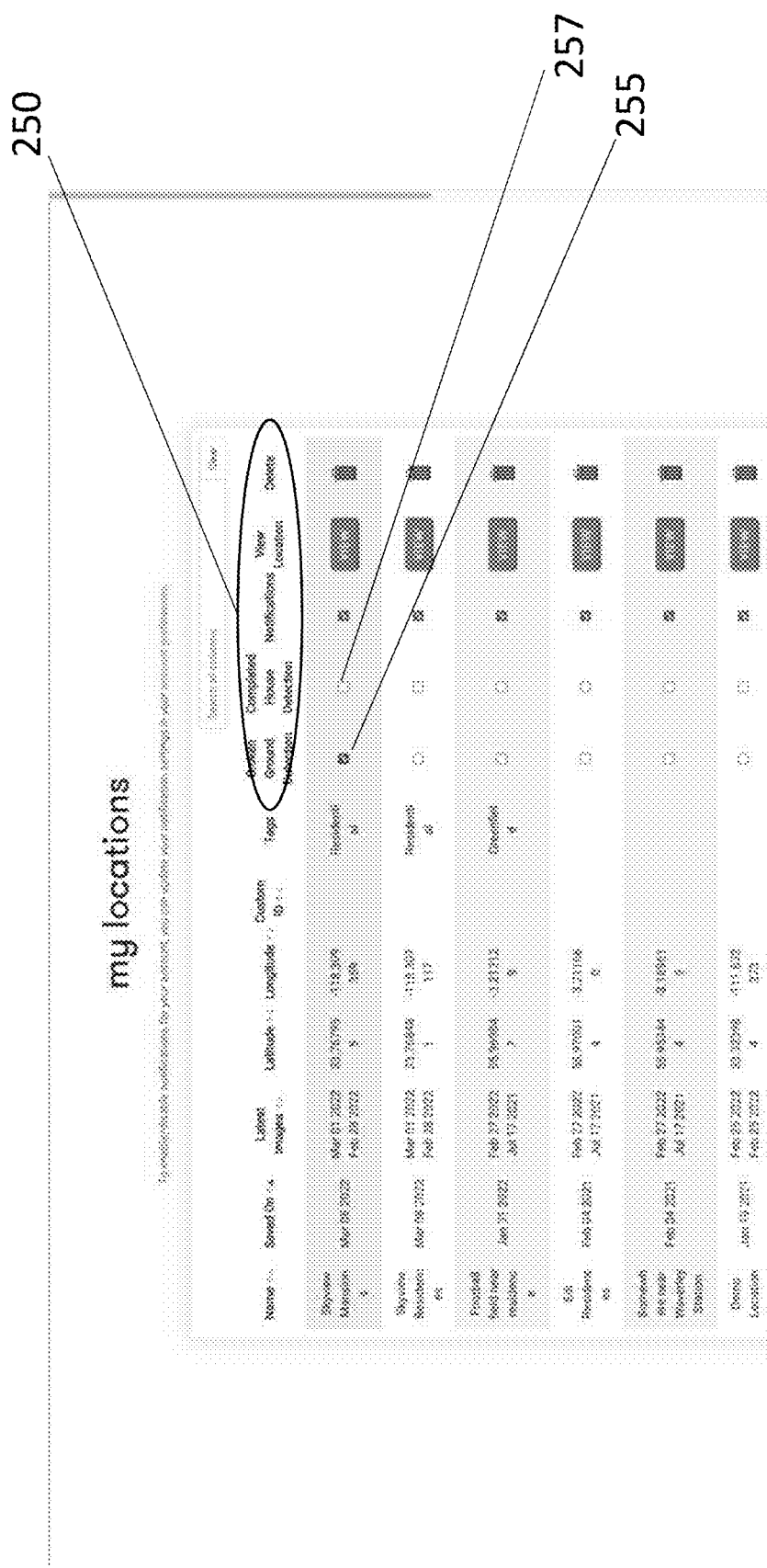
Figure 16:
Figure 17:
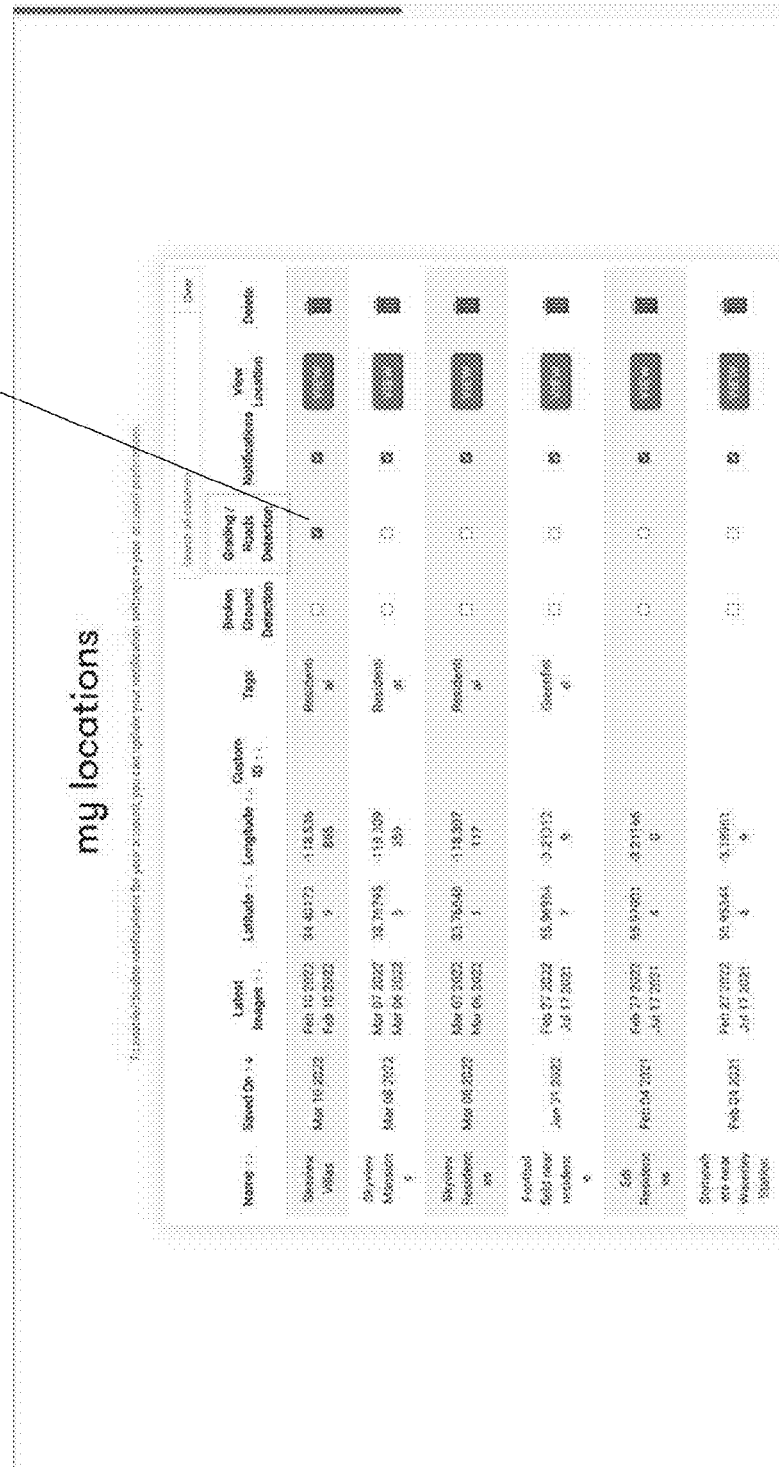

The user interface 20 can allow the user to create, define, or edit multiple locations stored in a storage of locations (Locations Storage 30), or delete them. FIG. 10 shows an input graphic 200 for naming and saving a selected location with respect to the potential housing construction activity shown in FIGS. 3-5. The input graphic 200 allows association of the named location with various tags to include information about the location. After saving, the user interface provides a confirmation message 210 confirming that the location was successfully saved, as shown in FIG. 11. Another example is shown in FIGS. 12-13 with respect to saving the potential area of road or grading building activity shown in FIGS. 6-9, with FIG. 12 showing the save location input screen 220 and FIG. 13 showing the saved location confirmation message 230. In some implementations, saved locations can be viewed and accessed on a Location Management Tab as shown in FIG. 14. The Locations Management Tab lists all locations saved, including information 240 such as location name, date saved, latest image, geographical coordinates, and tags. The Locations Management also allows the user to take actions 250 such as to receive notifications of housing activity, view or delete the location, or choose which aspects of housing construction the user is interested in such as Broken Ground Detection 255, which allows the user to subscribe location to a particular machine learned model for detecting new construction, or completed housing detection 257 for a machine learned model that predicts stages of construction, as shown in FIG. 15. FIGS. 16 and 17 show another example where a location 260 is saved and a Grading/Roads Detection Model 270 is selected, which allows a user to subscribe to a particular machine learned model for detecting new road/grading activity. The Locations Storage 30 can store the area in a format the allows for geographic calculations and determinations of the location of interest. The storage can be one or more relational databases that store the geographic information in one or more computer memory.

Referring back to FIG. 1, the geographic information in the Locations Storage 30 is then used to determine and select imagery corresponding to the location of interest. The selected imagery can be obtained from Imagery Provider Services 45 which employ satellites, unmanned aerial vehicles (UAVs), or High-Altitude Long Endurance (HALE) air vehicles with sensors 40 acquiring images over various parts of the world. This is an independent and asynchronous activity. Areas over the globe where images are acquired is a matter of decision making internal to the satellite/aerial operators but the user does not have a control in that decision making. These satellite or aerial images acquired by the satellite/aerial operators can be stored in Images Storage 50 databases which can include various national, regional, or state governmental databases, private databases, or academic databases. The satellite imagery may be from satellites acquiring public domain images (e.g., Landsat, Sentinel, MODUS) or those run by private companies (e.g., Airbus). These images are stored in multiple sizes and formats, including, but not limited to: JPEG, JPEG 2000, PNG, TIFF, GeoTIFF, ERDAS Imagine, IDRISI Raster, Envi Raw Raster and can be accessed through different protocols. The images can include monochromatic, panchromatic, multispectral, hyperspectral, binary, grayscale, indexed, infrared, RGB, radar or any combination thereof, and can include those with a high resolution (30 centimeters to 5 meters per pixel) for detecting features associated with housing construction. The images can also be used in conjunction with other sensing modalities such as light detection and ranging (LiDAR) for providing elevation data for detecting the features.

Figure 18:
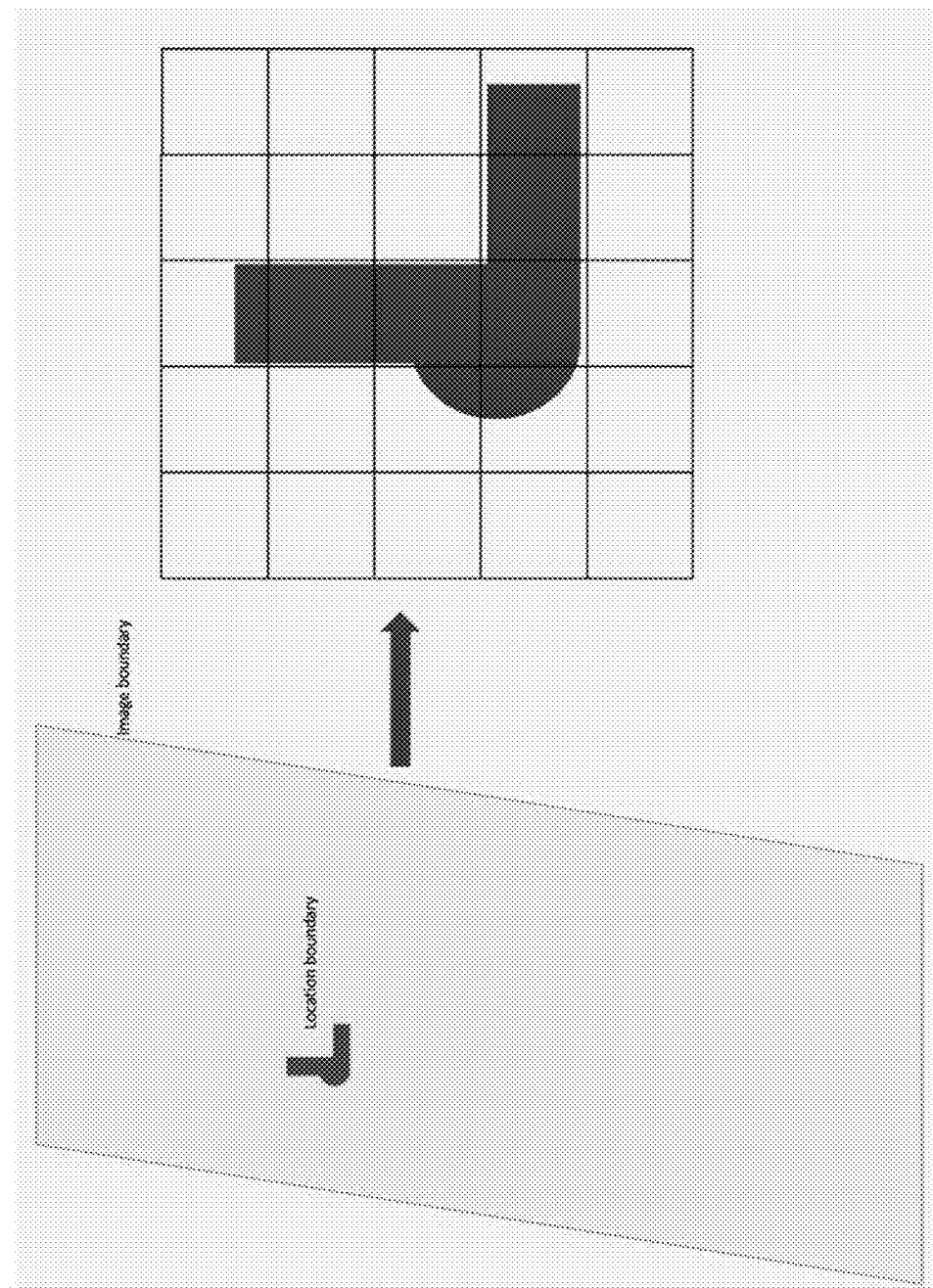
FIG. 18 is a schematic diagram showing an intersection operation between an image boundary with a location boundary and its output according to one implementation.

The images include information about the image containing details about image coverage, quality, resolution, colours, intensity, as well as geographic location information. This information is textual data called metadata which is organised in a structure that facilitates search and querying. The metadata can be extracted by satellite/aerial operators using advanced image and geographic reference processing 60. The metadata for every image acquired by the aerial/satellite operator) is stored in the Images Metadata Storage 70. As the Locations Storage 30 and Metadata Storages 70 both contain data with geographic information embedded, the location chosen by the user can be cross-referenced to corresponding imagery with the same location data instantaneously, and that imagery can be selected from the Images Storage 50 to be downloaded from the Imagery Provider. The process utilizes the information from the Images Metadata Storage 70 to download required portions of the image (explained in the Images and Cost Conservation section below). FIG. 18 shows an intersection operation between an image boundary with location boundary and its output. The intersection of a Location and the Image Metadata yields a reference for the image to be downloaded from the Imagery Provider 45. The intersection calculations are done instantaneously. Upon downloading, the image is stored in a separate image storage called Bird.i Image Storage 80.

The selected images in Bird.i storage 80 are fed to a trained Machine Learned Model 90. The trained Machine Learned Model 90 has features in the image associated with various stages of construction, new construction activity, or road and grading activity. The Machine Learned Model was trained by inputting training sets to a machine learning algorithm. Each training set includes images with features associated with the onset of construction activity, stages of construction, or grading and road development. Images lacking these features can also be included in the training sets to serve as a reference. The images used to train the model can be or include monochromatic, panchromatic, multispectral, hyperspectral, binary, grayscale, indexed, infrared, RGB, radar or any combination thereof. Each type of image has a particular type of sensor data associated with it. Monochromatic, panchromatic, multispectral, hyperspectral refer to the bands of light measured by the sensors. Monochromatic images capture varying intensities of a single colour of the visible spectrum, while panchromatic images collect all of the visible colours and combine them in one channel. Multispectral images are produced by measuring discreet, discontinuous bands and combining them, while hyperspectral images are measured by imaging spectrometers collecting information on a continuous spectrum which can include wavelengths invisible to the human eye. Each pixel of the hyperspectral image contains spectral information. Binary images contain two values: off (0) or on (1). Grayscale Images represent intensities ranging from least intense (black) to most intense (white). Indexed images are represented by color values within a color lookup table. RGB images include data representing color composed of red, green, and blue channels. The image data can also include two dimensions representing the relative location of the pixel in the image. The pixel data can be represented in common data types such as bytes and unsigned integers. Using machine learning algorithms, the model is trained by associating pixel data representing various construction or road and grading features with a classification or label (e.g., slab, foundation, under construction, completed; new construction present or absent; or roads, grading, or none). These features are represented as edges or geometric patterns within the pixel data where contrast with the background of the image occurs. For example, pixel information concerning slab construction in a plot of land may differ from that of a house with a roof by shape, color or intensity, and these differences are captured in the machine learned model to perform the classification. The image data can be supplemented with other data, such as LiDAR which measures the elevation of housing features. The Machine Learned Model then can output a classification or label as a prediction for features in a new image that was not seen by the model (i.e., not used to train the model) which includes a probability that the classification is correct. The machine learning model can be based on any machine learning algorithm that can create a classifier for images, including convolutional neural networks, as well as, statistical models such as, but not limited to Support Vector Machines, Random Forests and Decision Trees, Gradient Boosting Model, Naive Bayes Model and computer vision models such as, but not limited to Histogram of Oriented Gradients model and Hough Transforms. In one implementation, three different machine learned models are created: house construction stage detection (CHD), new construction activity detection (NUCD), and roads and grading detection (GRID).

The user interface 20 allows the user 10 to subscribe to one or more of the machine learned models, such as shown in FIGS. 15 and 17. The user interface can be hosted on the same computer or computing device as those hosting the machine learned models, or on a separate, remote computer or computing device such that the machine learned models are accessed through the internet. Geographic locations chosen by the user select corresponding updated images from the Imagery Provider Services 45, which are then fed to one or more models chosen from CHD, NUCD, and GRID subscribed toby the user. Each model will output image referenced coordinates for the particular features they were trained to detect.

Figures 19A, 19B:
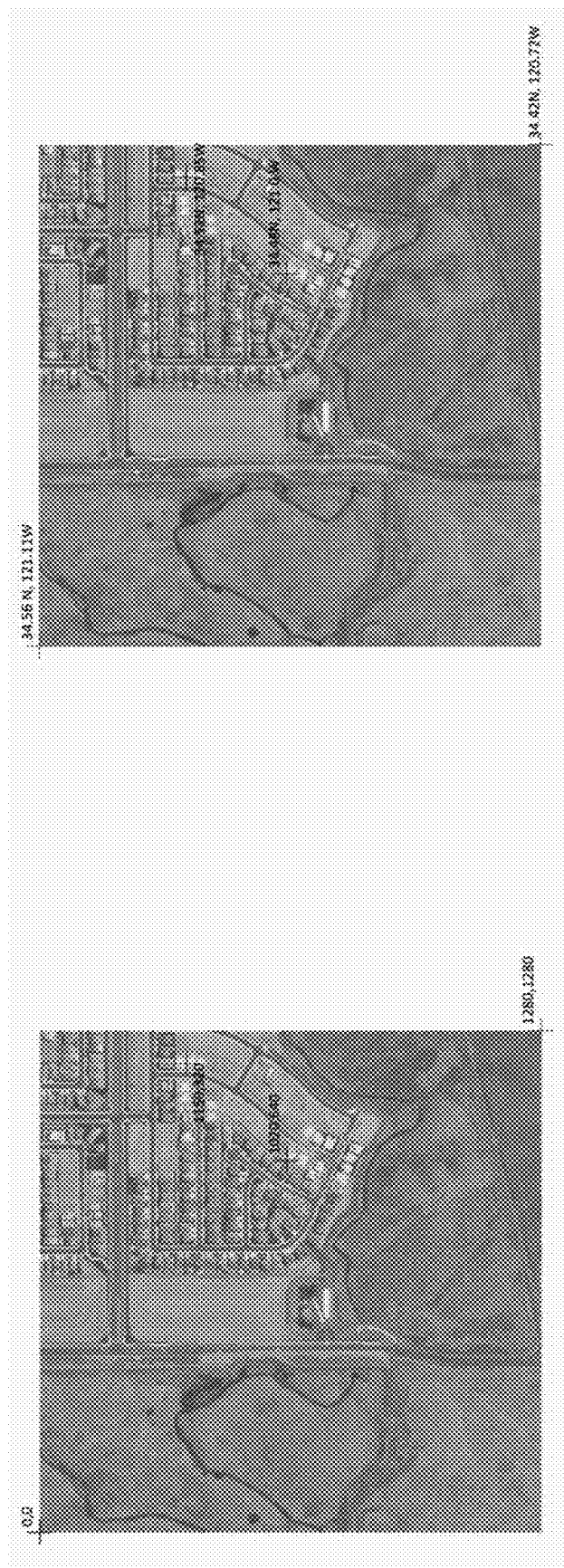
FIGS. 19A-B are screenshots of a user interface showing an image reference (FIG. 19A) and its corresponding geographic reference (FIG. 19B) of a location a user has selected for detecting stages of housing construction according to one implementation.
Figures 20A, 20B:
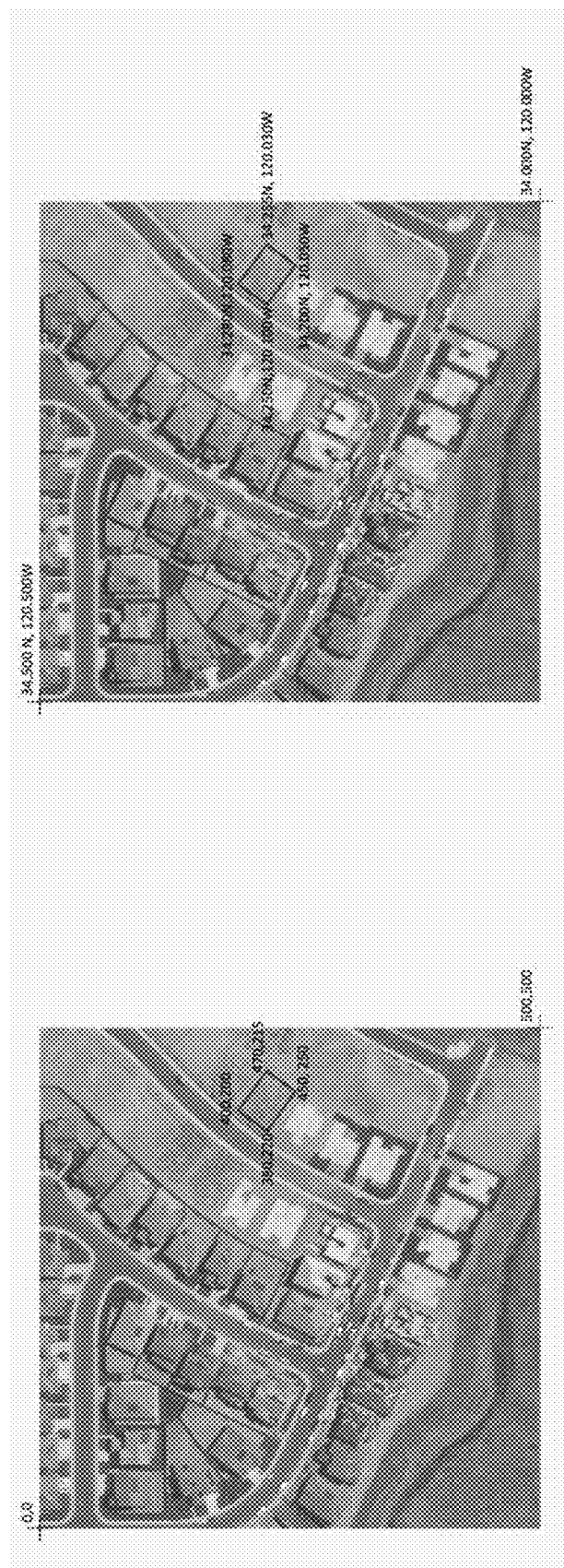
FIGS. 20A-B are screenshots of a user interface showing model outputs for detecting stages of housing construction with image references (FIG. 20A) and their conversion to geographic references (FIG. 20B) according to one implementation.

Machine Learning Model outputs are not easily parsed for human consumption. This is because the model is processing the features in the image through the form of pixel values and location, which have no direct bearing with the real-world geographic coordinates. Moreover, consumers' software systems are detached and need a standardised method of consuming the model outputs. To achieve this, each image is anchored to its corresponding geographic location and all outputs are converted to a standardised format that can be consumed by the user. The image reference coordinates refer to pixel location values in a coordinate system that starts with 0,0 at the top left corner of the image with values increasing to the right and down. This is converted to real world geographic coordinates and a standardised format as shown in FIGS. 19A-B and 20A-B, with FIGS. 19A and 20A showing pixel location values and FIGS. 19B and 20B showing real world coordinates. Upon conversion, the images are stored in the iPoint Storage 100 shown in FIG. 1. Real world coordinates refer to the corresponding location on earth measured in latitude and longitude measured North/South from the equator and the East/West from the Greenwich meridian. The iPoint data corresponds to each individual housing construction feature detected in the image or square segment of road or grading. For housing construction, information about the construction status, the boundary and a center point of each house is included. It also provides a score of the model's confidence in its prediction.

Figure 21:
FIGS. 21-22 are screenshots of a user interface showing model output predictions for detecting stages of housing construction overlaid on the original location defined by the user according to one implementation.
Figure 22:
Figure 23A:
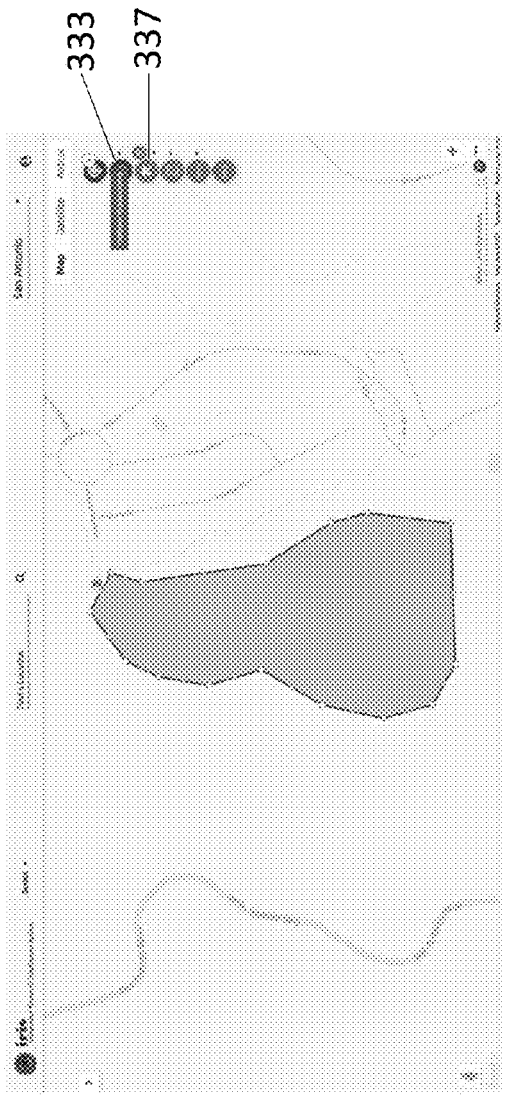
FIG. 23A is a screenshot of a user interface showing a map view of a geographic location inputted by a user for detecting stages of housing construction according to one implementation.
Figure 23B:
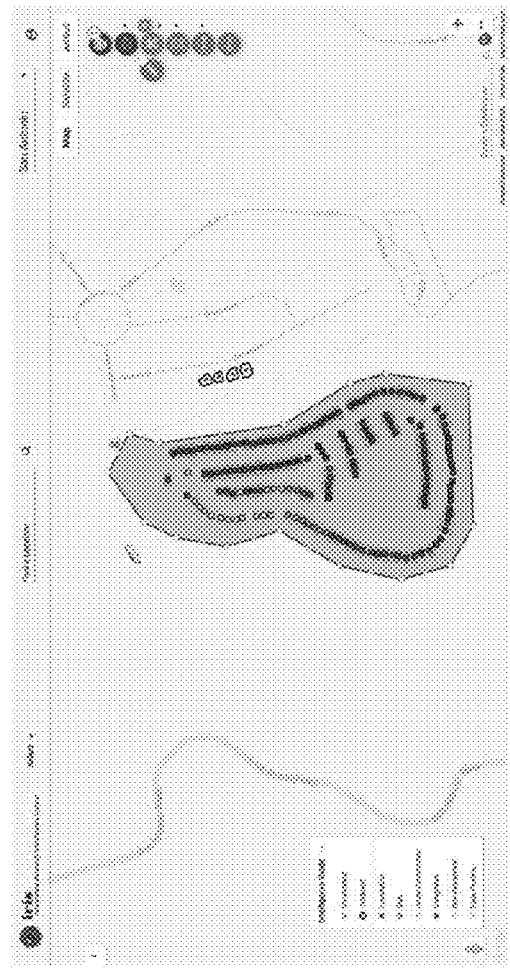
FIG. 23B is a screenshot of a user interface showing a map view of a geographic location inputted by a user for detecting stages of housing construction and overlaid model outputs (iPoint data) according to one implementation.
Figure 24:
FIG. 24 is a screenshot of a user interface showing an image view of a geographic location inputted by a user for detecting new construction activity and overlaid model outputs showing confidence score and date of image according to one implementation.
Figure 25:
FIG. 25 is a screenshot of a user interface showing an image view of a geographic location inputted by a user for detecting new construction activity and model output coordinates in relation to image pixels according to one implementation.
Figure 26:
FIG. 26 is a screenshot of a user interface showing an image view of a geographic location inputted by a user for detecting new construction activity and model output coordinates in relation to real world latitude and longitude according to one implementation.
Figure 27:
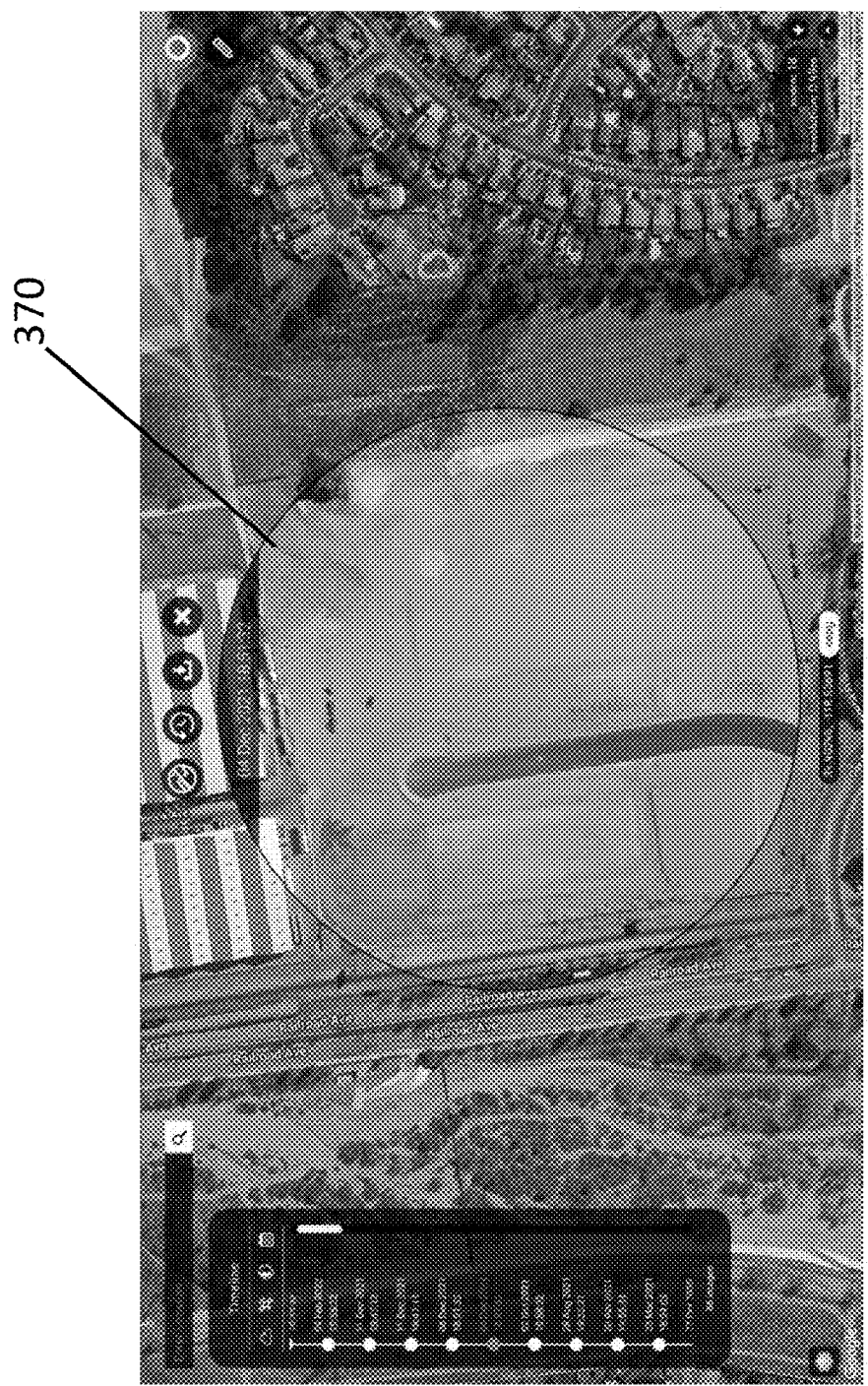
FIG. 27 is a screenshot of a user interface showing an image from an imagery provider overlaid on top of a saved location inputted by a user for detecting roads and grading according to one implementation.
Figure 28:
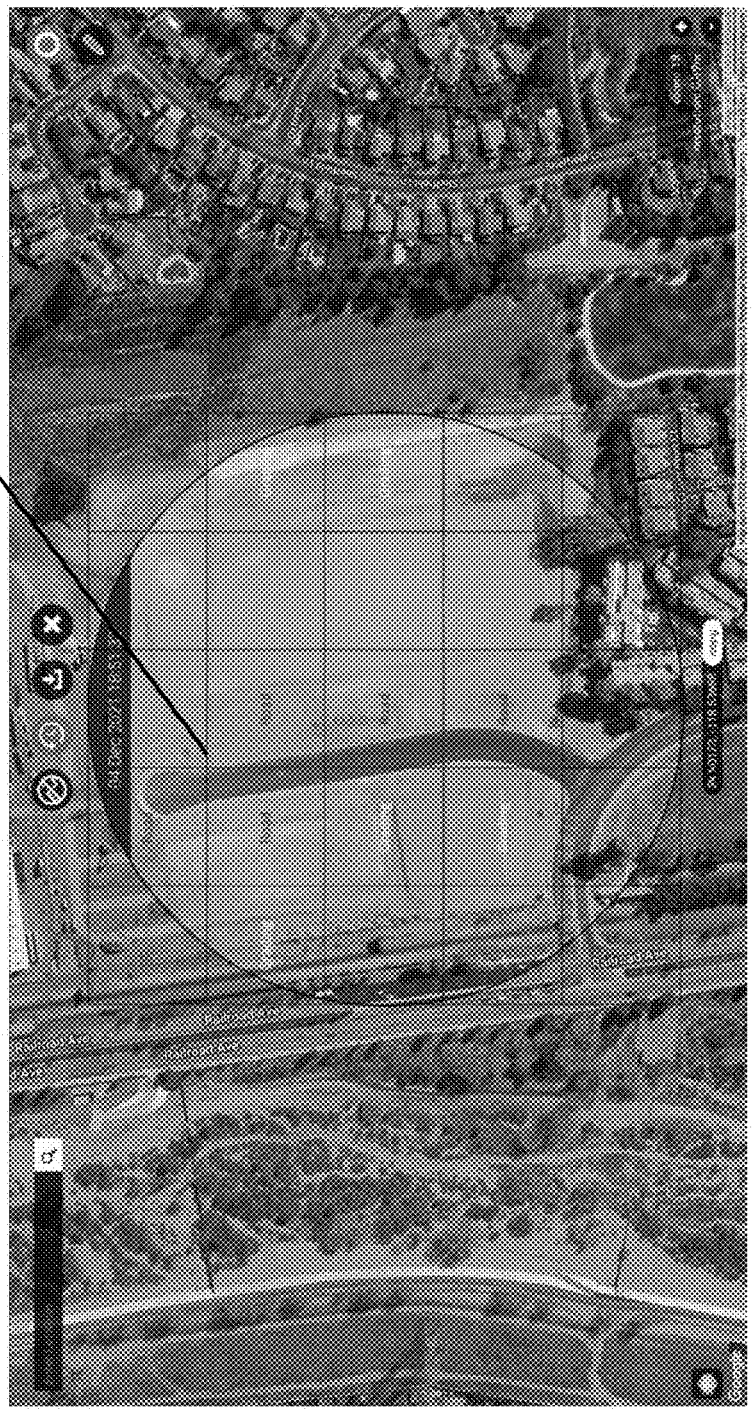
FIGS. 28-30 are screenshots of a user interface showing model outputs for detecting roads and grading overlaid over the image inputted by the user according to one implementation.
Figure 29:
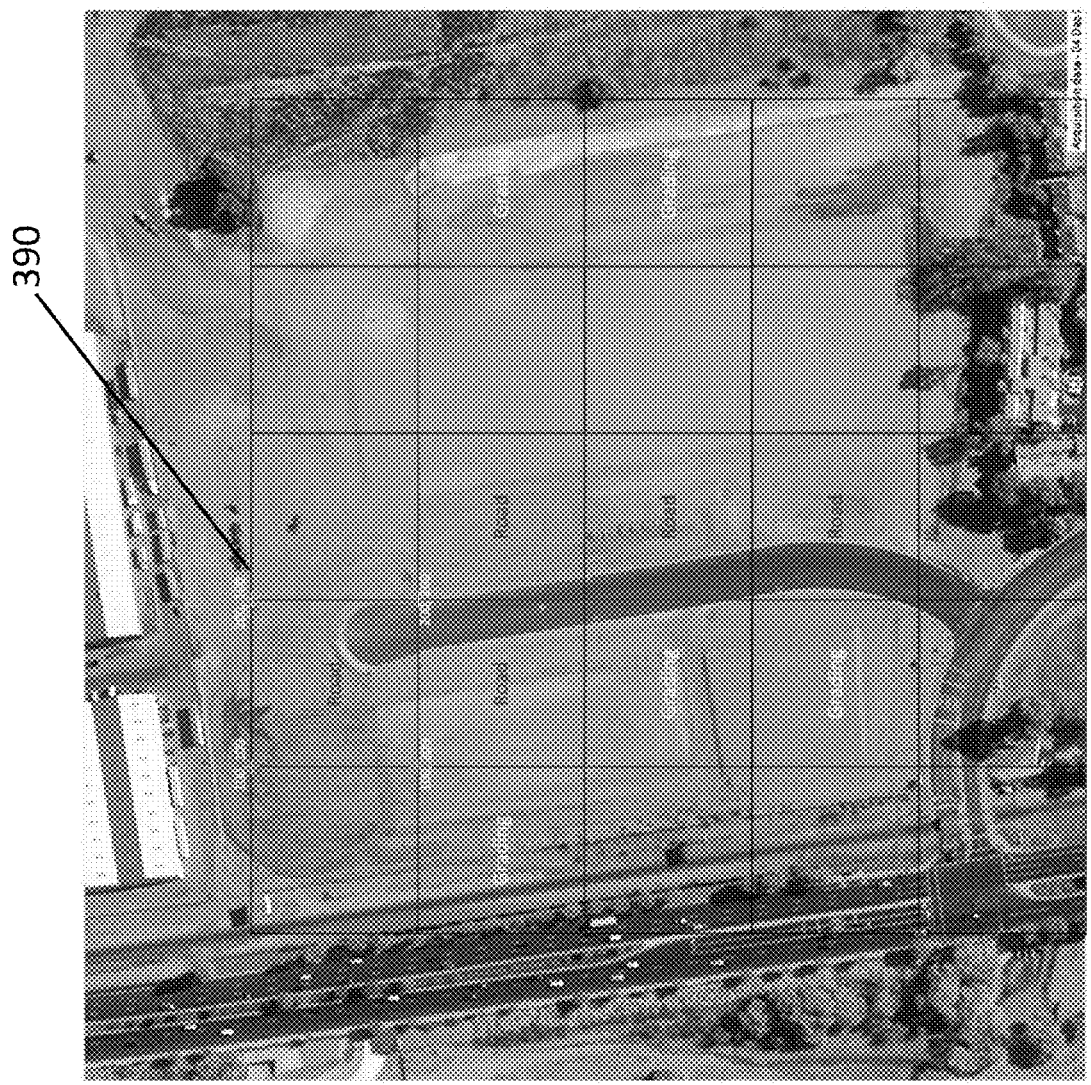
Figure 30:
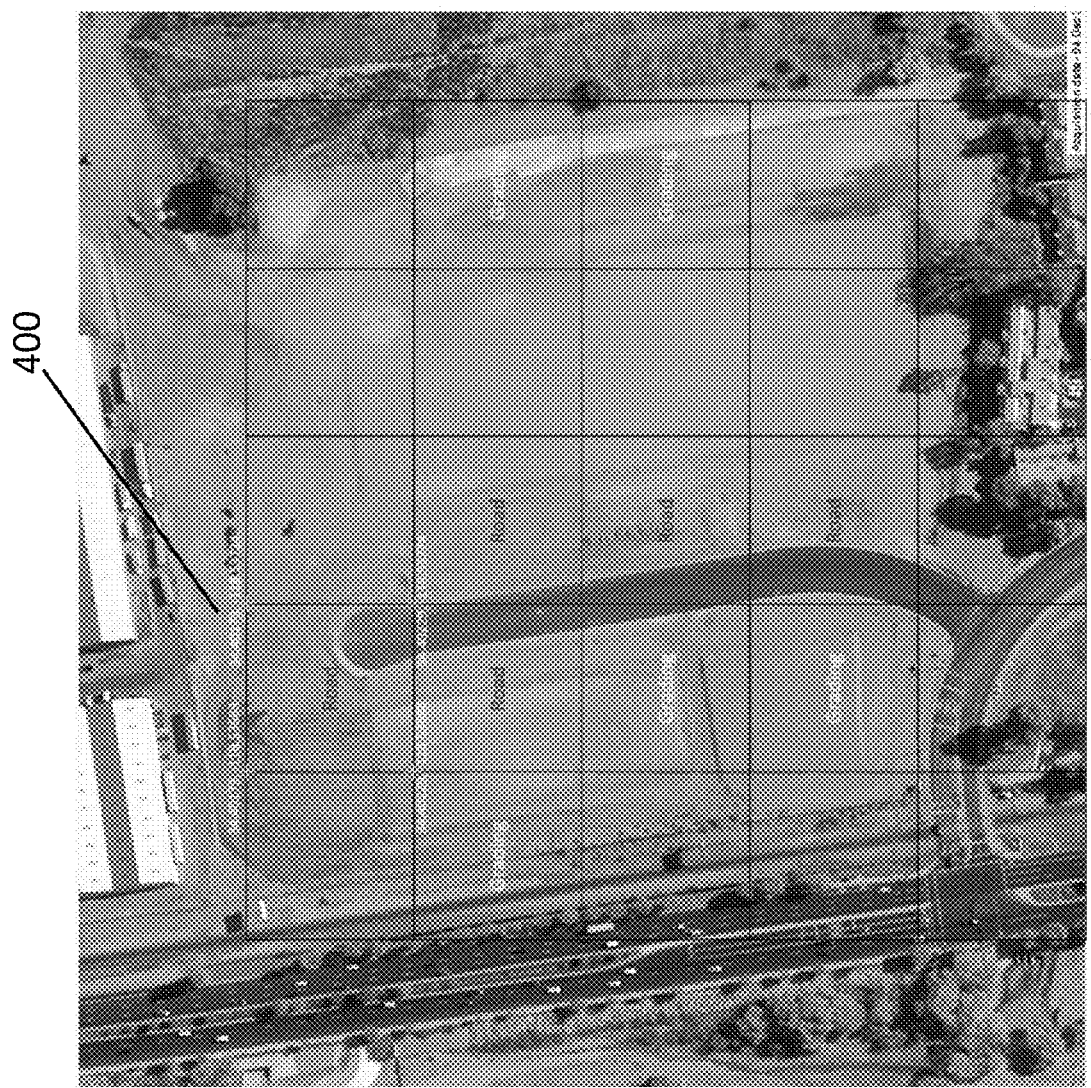

The data from the iPoints Storage 100 are delivered 110 to the user. The data can be delivered in the form of email notifications and/or through updates on the user interface. Since they are in a standardised format, the data can be directly outputted to the user interface that was used to define the location to begin with. Alternatively, or in addition, the data from iPoints Storage can be outputted to any standard Geographic Information System (GIS) application. When the iPoint data is outputted to the user interface, it is overlaid over the image that was used to define the geographic area of interest and corresponding imagery used by the Machine Learned Model 90 to make the predictions. This image layer can be switched on/off as per the user's convenience. FIG. 21 shows model predictions overlaid on a satellite image of the original location defined by the user and FIG. 22 shows a zoomed in view of the model predictions in the satellite image, where different colours indicate different stages of construction. The boundaries and centre points of each house are also shown. FIGS. 23A-B shows another example of an overview of the user interface and a location inputted in it on a map view of the location. User controls include an Add/Edit Location Tool 333 and an iPoints Control Tool 337 including editing and addition and hiding/showing of the iPoint Data, as shown in FIG. 23A. FIG. 23B shows both input location and output iPoints on the map. With respect to detection of new housing construction, FIG. 24 shows model outputs 342 for new construction activity displayed on the user interface, with confidence score and date of image. The user interface includes a toggle control 348 to switch on/off the image and iPoint Layer. FIG. 25 shows the model output coordinates of FIG. 24 in relation to image pixels and FIG. 26 shows the model output coordinates in relation to real world latitude and longitude. FIGS. 27-30 show model outputs with respect to grading and road detection. FIG. 27 shows an image 370 overlaid over the base map when acquired by the satellite operator. FIG. 28 shows GRID model detections 380 overlaid over the image that was used to detect them. Text (Grading/Road) is the model prediction. FIG. 29 shows image pixel coordinates 390 for one detection of a square segment from the model. Numbers in yellow indicate the coordinate values for the four corners of the square. FIG. 30 shows image geographic coordinates 400 obtained by converting image pixel coordinates so that they can be used in GIS applications. Numbers in yellow indicate the coordinate values for the four corners of the square.

As explained for the flow diagram in FIG. 1, the output data from the model is converted and formatted in a standardised manner. This format facilitates easy consumption using any geographic information system (GIS). Examples are shown in FIGS. 31-33, for housing stage construction detection (CHD, FIG. 31), new housing construction activity detection (NUCD, FIG. 32), and for grading/road construction activity detection (GRID, FIG. 33).

Image and Cost Conservation

One of the fundamental factors in implementing a Machine Learning product is the prohibitive cost of input data. Imagery acquired from above the ground using any form of platform is even more so expensive. Cost reduction is always desirable, particularly in the field of cloud engineering because cloud resources are highly optimized and every bit of expenditure is in a way contributing to energy consumption. In one implementation, images are crafted in a way that unwanted areas are not consumed thus saving unnecessary processing as well as expenditure.

Figure 34:
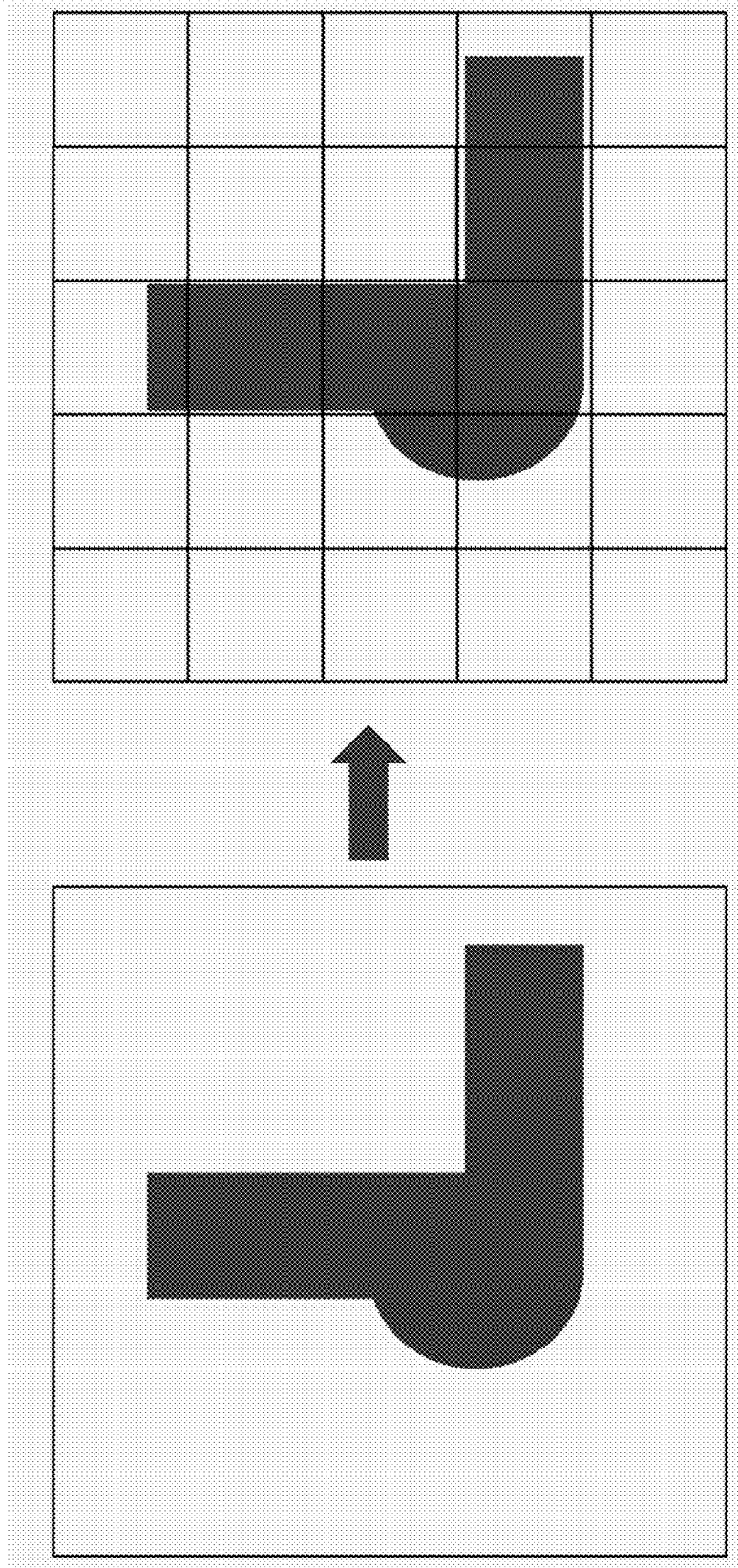
FIGS. 34-35 are schematic diagrams showing a cost conservation method, with FIG. 34 showing identification of image portions to be used, and FIG. 35 showing a sectioned square image result of the method for machine learning processing according to one implementation.

The start point for the workflow in this claim is the user inputting their locations of interest. The user can draw any arbitrary shape over land where they are interested in monitoring residential construction activity shown in the schematic diagram at FIG. 1. FIG. 34 shows an overlay of a fixed size grid to identify unwanted parts of a standard square image that can be ignored and those image portions to be used, thus achieving a cost reduction in data consumption.

Figure 35:
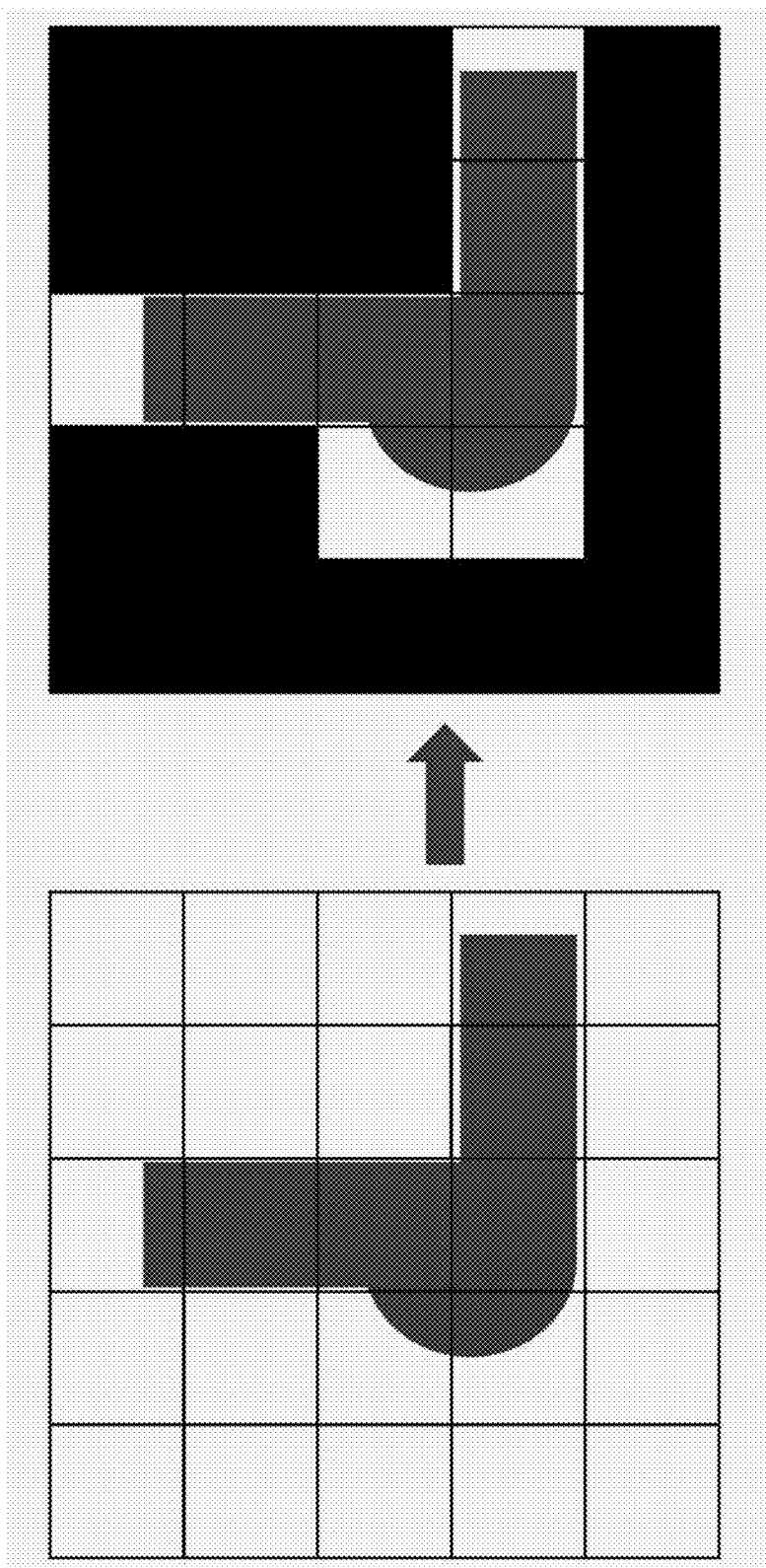

Rather than request for all parts of the image, only the portion that covers the user's location is requisitioned from the Imagery Provider. As shown in FIG. 35, only 8 of 25 squares are requisitioned from the provider, causing a cost reduction of 68%. Once the unwanted areas are identified, they are filled with blackened equivalent portions. This is because Machine Learning models work best with fixed image sizes.

As can be appreciated by those in the computer engineering arts, inputting steps depicted in the figures, such as inputting a geographic area to choose a location can be performed through one or more input-output (I/O) interface on a fixed position computer such as a desktop computer or server or on a portable computer/computing device, such as a tablet, laptop, PDA, or smartphone. Visual prompting can take the form of a message and/or input field provided to the user on a display. The input field can be provided as part of a graphical user interface provided on the display of a computer or computing device which provides one or more data entry fields, check boxes, or pull-downs which allow the user to input a geographic area and associated data. Auditory prompting can take the form of speech or a recording broadcast from a speaker which prompts the user to enter the location. Inputting steps can be performed through traditional inputting means such as a physical keyboard or a keyboard projected on a display, such as a touchscreen. The keyboard can be a QWERTY keyboard or a condensed keyboard commonly used in electronic devices such as cell phones. Inputting can also be performed through the user providing speech which is inputted through a microphone of the computer or computing device and recognized by speech recognition algorithms programmed on the computer or computing device. Outputting steps can be formed through a visual output device such as a display on the computer or computing device.

Computer-executable code or instructions for performing the process steps (such as those shown in FIG. 1) can be implemented as software or an application capable of being run on the computer(s) or computing device(s). The computer-executable code or instructions can be installed on the computer or computing device during manufacture as software, or implemented as firmware or hardware (e.g., circuitry), or some combination of these. The computer-executable code or instructions can be configured to be downloadable onto the memory of the computer or computing device from a cloud storage source available on the internet, such as an application retail source (e.g., "app store") capable of being accessed from a mobile phone, tablet, desktop computer, or other programmable device having components or features capable of performing the method steps described above. Examples of suitable internet-accessible sources include the Apple Store, Google Play, and other sites that make software applications and other downloads available for purchase or license. The computer-executable code or instructions can also be hosted on a server or servers accessible to users through a network connection, or can be distributed between a server and an application installed on a user's device.

The computer-readable code, computer-readable instructions, computer-executable instructions, or "software" can be organized into routines, subroutines, procedures, objects, methods, functions, or any other organization of computer-executable instructions that is known or becomes known to a skilled artisan in light of this disclosure, and can be programmed in any suitable programming language, including PHP, HTML, JavaScript, C, C#, C++, Java, Python, Perl, Ruby, Swift, Visual Basic, and Objective C. By such programming, the computer-readable code, computer-readable instructions, computer-executable instructions, or "software" instruct one or more processors of the computer or computing device to carry out the operations and commands of the application. Inputted locations or geographic areas can be stored in the computer or computing device's memory. The memory can be implemented through non-transitory computer-readable storage media such as RAM. As used in the context of this specification, a "non-transitory computer-readable storage medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM.

In one implementation, a computer system for performing the process of FIG. 1 includes 1) one or more computer that is located remotely from a user 10 and connected to the internet and to each other and 2) a computer or computing device accessible to the user that can communicate with the remote computer(s) through a network. The remote computer(s) can be a fixed position computer, and the user's computer or computing device can be fixed such as a desktop computer or mobile/portable. The user's computer or device can be a desktop computer, tablet, or smartphone that can access the user interface 20 of FIG. 1. The user interface 20 can be downloaded as an application from cloud storage services providing retail application downloading to the user's computer or computing device, or can be hosted on a remote computer which acts as a web server and accessed through the internet through an internet browser on the user's computer or computing device. The remote computer(s) can receive geographical location or area information inputted by the user through the user interface (either provided as the application on the user's computer or device, or accessed through the web server) and can have a memory capable of housing storages of FIG. 1 such as Locations Storage 30, Images Metadata Storage 70, Birdi Image Storage 80, IPoint Storage 100. The memory can house one or more Machine Learned Models 90 used to predict housing or road construction features. Metadata Processing can be hosted on the remote computer(s) and performed through their processors. The storages can be relational databases stored in memory that communicate by way of a database server or servers with the user's computer or computing device or other remote computers. The remote computer(s) can include a set of computer-executable instructions stored in memory which can be used to perform predictions by the Machine Learned Models. The remote computer(s) can then communicate to the user's computer or computing device the results of such predictions 110 as well as notifications. In some implementations, one or more additional steps or functions in the process of FIG. 1 are performed on the user's computer or computing device instead of remotely. In other implementations, the entire set of steps performed outside of the Imagery Provider Service 45 are performed on the user's computer or computing device. The process need not limited to one particular distribution of functions between those hosted on the user's computer or computer device and those hosted remotely; multiple configurations hosted on one or more computers are contemplated.

Additional embodiments include a computer, computing device, or system or combination thereof capable of carrying out the process and its implementations. The computer, computing device, system or combination thereof can include one or more processors capable of executing the computer-readable code, computer-readable instructions, computer-executable instructions, or "software", one or more interface capable of providing input or output, one or more databases and a set of instructions (e.g., software) stored in a memory of the computer, computing device, or system or combination thereof for carrying out the process. The computer, computing device, or system or combination thereof can include one or more stand-alone computer, such as a desktop computer, a portable computer, such as a tablet, laptop, PDA, or smartphone, or a set of computers or devices connected through a network including a client-server configuration and one or more database servers. The network can use any suitable network protocol, including IP, UDP, or ICMP, and may be any suitable wired or wireless network including any local area network, wide area network, Internet network, telecommunications network, Wi-Fi enabled network, or Bluetooth enabled network. In this way, one or more steps of the process can be distributed across the system or combination, or performed on only one computer or computing device, according to specific applications or designs.

Computers, computing devices, or systems thereof described herein can include a variety of components known in the art, including one or more processor, a volatile memory, a non-volatile memory, standard I/O interfaces such as a universal serial bus (USB) port, an HDMI or HDMI ARC port, an optical port, an ethernet port, and/or a serial port, a hard drive, a disk drive, a CD-ROM drive, a motherboard, a printed circuit board (PCB), circuitry for enabling a wireless connection or communication to another device, such as a BLUETOOTH® board, a Wi-Fi board, or a transmitter-receiver for mobile telecommunications, a data bus, an address bus, a control bus, and/or one or more user interface devices including a display, keyboard, keypad, trackpad, mouse, control panel, touch screen display, speaker, camera, and/or microphone. The computers, computing devices, or systems thereof can be equipped with an operating system implemented as software or firmware. As can be appreciated, the computers, computing devices, or systems may differ in their inclusion, exclusion, or configuration of components according to their individual applications or designs.

EXAMPLE

FIG. 36 is a table which shows an example of timeline of activities and interactions in the process shown in FIG. 1. On Day 0, the User has a location they are interested in where house construction is likely to happen. They add this location (named L-1) by outlining its boundary on the user interface. The user interface is hosted on the internet and is accessible from anywhere. On Day 1, an aerial imagery operator independently captures imagery that covers the location L-1. Day 1 can be anywhere between 1 and 90 days, depending on the location. A notification by email is sent to the user's computer about this (Image Availability Notification). On Day 1 plus 1 day, the extent of image that covers L-1 is downloaded from the imagery operator by the system. The download occurs after geographic algorithms and processing determine the extent of data required. The image is fed to 1) a machine learned model that predicts where houses are and what their status is (foundation, slab, under construction or completed), 2) a machine learned model that predicts whether or not construction has begun, or 3) a machine learned model that predicts road or grading construction activity. This happens automatically through Artificial Intelligence Algorithms and processing. The model outputs are exported to the user interface for the user to review. A notification by email is sent to the user about this availability (iPoints Availability Notification).

The present disclosure has described particular implementations having various features. In light of the disclosure provided above, it will be apparent to those skilled in the art that various modifications and variations can be made without departing from the scope or spirit of the disclosure. One skilled in the art will recognize that the disclosed features may be used singularly, in any combination, or omitted based on the requirements and specifications of a given application or design. When an implementation refers to "comprising" certain features, it is to be understood that the implementations can alternatively "consist of" or "consist essentially of" any one or more of the features. Other implementations will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including patents, published applications, and non-patent literature are each individually incorporated by reference herein in their entireties and as such are intended to provide an efficient way of supplementing the enabling disclosure as well as provide background detailing the level of ordinary skill in the art.

The invention claimed is:

1. A method comprising:
   selecting a geographic area of interest on a map or satellite or aerial image;
   causing a satellite or aerial image or portion thereof corresponding to the geographic area of interest to be sent as input for a machine learned model trained with a set of satellite or aerial images having features characteristic of housing at four different stages of construction and corresponding labels representing such stages; and
   receiving one or more output from the machine learned model, the output comprising one or more predictions of the stages of construction determined for the features in the satellite or aerial image or portion thereof;
   wherein the four different stages of construction are slab, foundation, under construction, and completed;
   wherein the selecting and causing are based upon input from a Geographic Information System application;
   wherein the output comprises text formatted and standardized for input into the Geographic Information System application; and
   wherein the text formatted and standardized for input into the Geographic Information System application comprises:
   a feature name;
   a label for the feature representing a prediction chosen from slab, foundation, under construction, and completed;
   a decimal probability that the label for the feature is correct; and
   a centroid and polygonal boundary of the feature, both expressed as geographical coordinates.

2. The method of claim 1, wherein the input comprises one or more location information chosen from information comprising city, county, state, zip code, geographic coordinates and tax parcel number.

3. The method of claim 1, wherein the input comprises providing an outline surrounding the geographic area of interest.

4. The method of claim 1, wherein the machine learned model is a trained Convolutional Neural Network (CNN).

5. The method of claim 1, wherein the selecting, causing, and receiving are performed by one or more processors.

* * * * *